(12) United States Patent
Fead et al.

(10) Patent No.: US 12,282,894 B2
(45) Date of Patent: *Apr. 22, 2025

(54) RADIO FREQUENCY IDENTIFICATION SCANNING USING THE INTERNET OF THINGS

(71) Applicant: NIKE, Inc., Beaverton, OR (US)

(72) Inventors: Andrew Fead, Beaverton, OR (US); Fredy Rusli, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,804

(22) Filed: Dec. 27, 2023

(65) Prior Publication Data

US 2024/0127176 A1  Apr. 18, 2024

Related U.S. Application Data

(63) Continuation of application No. 18/110,786, filed on Feb. 16, 2023, now Pat. No. 11,893,532, which is a
(Continued)

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .......................... G06Q 10/087; G06K 7/10366
(Continued)

(56) References Cited

U.S. PATENT DOCUMENTS 7,286,888 B2  10/2007  Monette et al.
8,538,829 B1   9/2013  Hu et al.
(Continued)

FOREIGN PATENT DOCUMENTS

CN   101894280 A   11/2010
CN   103034821 A    4/2013
(Continued)

OTHER PUBLICATIONS

Office Action received for European Application No. 20784255.0, mailed on Feb. 28, 2024, 8 pages.
(Continued)

*Primary Examiner* — Allyson N Trail
(74) *Attorney, Agent, or Firm* — SHOOK, HARDY & BACON L.L.P.

(57) ABSTRACT

Aspects of the technology described herein provide a system for an improved inventory system using RFID information. A first user device may initiate a team scanning session and a second user device may join the team scanning session. RFID scan data received by each of the first user device and the second user device may be filtered, aggregated, and sent to an inventory system using a first IoT topic. An inventory list for the team scanning session may be updated with the information provided by each of the first and second user devices and published to each of the user devices using a second IoT topic. Additional RFID scan data received by each user device may trigger an indication to the user that a particular RFID scan data had not yet been scanned during the team scanning session.

20 Claims, 9 Drawing Sheets

Related U.S. Application Data continuation of application No. 17/532,055, filed on Nov. 22, 2021, now Pat. No. 11,605,053, which is a continuation of application No. 16/821,696, filed on Mar. 17, 2020, now Pat. No. 11,182,742.

(60) Provisional application No. 62/829,892, filed on Apr. 5, 2019.

(58) Field of Classification Search
USPC .......................................................... 235/385
See application file for complete search history.

(56) References Cited

U.S. PATENT DOCUMENTS

| | | |
|---|---|---|
| 9,626,543 B1 | 4/2017 | Ray et al. |
| 9,641,400 B2 | 5/2017 | Britt et al. |
| 9,980,681 B1 | 5/2018 | Laborde |
| 10,055,697 B2 | 8/2018 | M et al. |
| 10,087,063 B2 | 10/2018 | Zimmerman et al. |
| 2004/0181467 A1 | 9/2004 | Raiyani et al. |
| 2006/0116842 A1 | 6/2006 | Tarantola et al. |
| 2007/0132584 A1 | 6/2007 | Malacarne et al. |
| 2009/0322489 A1 | 12/2009 | Jones et al. |
| 2011/0169607 A1 | 7/2011 | Paulson |
| 2012/0101714 A1 | 4/2012 | Kamaya et al. |
| 2012/0112904 A1 | 5/2012 | Nagy |
| 2013/0082841 A1 | 4/2013 | Joseph |
| 2013/0091205 A1 | 4/2013 | Kotler et al. |
| 2013/0201003 A1 | 8/2013 | Sabesan et al. |
| 2013/0234831 A1 | 9/2013 | Sabesan et al. |
| 2014/0129378 A1 | 5/2014 | Richardson |
| 2014/0304107 A1 | 10/2014 | McAllister |
| 2015/0081474 A1 | 3/2015 | Kostka et al. |
| 2015/0156266 A1 | 6/2015 | Gupta |
| 2015/0186836 A1 | 7/2015 | Chouhan et al. |
| 2015/0235061 A1 | 8/2015 | Wang et al. |
| 2015/0359189 A1 | 12/2015 | Bernardini et al. |
| 2016/0055560 A1 | 2/2016 | McKelvey |
| 2016/0065630 A1 | 3/2016 | Gupta et al. |
| 2016/0078264 A1 | 3/2016 | Armstrong et al. |
| 2016/0119379 A1 | 4/2016 | Nadkarni |
| 2016/0128043 A1 | 5/2016 | Shuman et al. |
| 2016/0134932 A1 | 5/2016 | Karp et al. |
| 2016/0142758 A1 | 5/2016 | Karp et al. |
| 2016/0314434 A1 | 10/2016 | Kamaya et al. |
| 2016/0316317 A1 | 10/2016 | Mayiras |
| 2016/0321308 A1 | 11/2016 | Brinnand |
| 2016/0364681 A1 | 12/2016 | Andrus |
| 2017/0060574 A1 | 3/2017 | Malladi et al. |
| 2017/0061175 A1 | 3/2017 | Lee |
| 2017/0063566 A1 | 3/2017 | Seminario et al. |
| 2017/0075693 A1 | 3/2017 | Bishop et al. |
| 2017/0075721 A1 | 3/2017 | Bishop et al. |
| 2017/0083175 A1 | 3/2017 | Layman et al. |
| 2017/0083368 A1 | 3/2017 | Bishop et al. |
| 2017/0083378 A1 | 3/2017 | Bishop et al. |
| 2017/0083380 A1 | 3/2017 | Bishop et al. |
| 2017/0083386 A1 | 3/2017 | Wing et al. |
| 2017/0083396 A1 | 3/2017 | Bishop et al. |
| 2017/0085445 A1 | 3/2017 | Layman et al. |
| 2017/0086281 A1 | 3/2017 | Avrahamy |
| 2017/0091807 A1 | 3/2017 | Liu et al. |
| 2017/0091808 A1 | 3/2017 | Yu et al. |
| 2017/0091809 A1 | 3/2017 | Liu et al. |
| 2017/0116089 A1 | 4/2017 | Park et al. |
| 2017/0116210 A1 | 4/2017 | Park et al. |
| 2017/0116572 A1 | 4/2017 | Natarajan et al. |
| 2017/0118499 A1 | 4/2017 | Karp et al. |
| 2017/0132892 A1 | 5/2017 | Vargas et al. |
| 2017/0148018 A1 | 5/2017 | Levin |
| 2017/0169264 A1 | 6/2017 | Britt et al. |
| 2017/0171178 A1 | 6/2017 | Reynders |
| 2017/0206532 A1 | 7/2017 | Choi |
| 2017/0220612 A1 | 8/2017 | Crossley et al. |
| 2017/0228253 A1 | 8/2017 | Layman et al. |
| 2017/0265287 A1 | 9/2017 | Avrahamy |
| 2017/0300980 A1 | 10/2017 | Soldate et al. |
| 2017/0336397 A1 | 11/2017 | Kwang et al. |
| 2017/0336428 A1 | 11/2017 | Kwang et al. |
| 2018/0018519 A1 | 1/2018 | O'Brien et al. |
| 2018/0032948 A1 | 2/2018 | Alvarez et al. |
| 2018/0053239 A1 | 2/2018 | Li |
| 2018/0082029 A1 | 3/2018 | Bureau |
| 2018/0089607 A1 | 3/2018 | Iu et al. |
| 2018/0092313 A1 | 4/2018 | Avrahamy |
| 2018/0114250 A1 | 4/2018 | Phillips et al. |
| 2018/0130010 A1 | 5/2018 | Kurian |
| 2018/0137457 A1 | 5/2018 | Sachs et al. |
| 2018/0158020 A1 | 6/2018 | Khasis |
| 2018/0182013 A1 | 6/2018 | Haubold |
| 2018/0227369 A1 | 8/2018 | Ducray et al. |
| 2018/0227620 A1 | 8/2018 | Karp et al. |
| 2018/0253335 A1 | 9/2018 | Bishop et al. |
| 2018/0300124 A1 | 10/2018 | Malladi et al. |
| 2018/0307571 A1 | 10/2018 | Bishop et al. |
| 2018/0322376 A1 | 11/2018 | Henry et al. |
| 2018/0365616 A1 | 12/2018 | Taylor et al. |
| 2019/0007651 A1 | 1/2019 | Scanlon et al. |
| 2019/0072424 A1 | 3/2019 | Clment et al. |
| 2019/0080280 A1 | 3/2019 | Tingler et al. |
| 2019/0370721 A1 | 12/2019 | Issac |
| 2020/0320469 A1 | 10/2020 | Fead et al. |
| 2020/0320476 A1 | 10/2020 | Ellis |
| 2022/0083960 A1 | 3/2022 | Fead et al. |
| 2022/0200851 A1 | 6/2022 | Smith et al. |

FOREIGN PATENT DOCUMENTS

| | | |
|---|---|---|
| CN | 105794176 A | 7/2016 |
| JP | 2007-217069 A | 8/2007 |
| JP | 2010-044724 A | 2/2010 |
| JP | 2012-158455 A | 8/2012 |
| JP | 2017-045440 A | 3/2017 |
| JP | 2018-160143 A | 10/2018 |
| JP | 2019-032764 A | 2/2019 |
| JP | 2020-503784 A | 1/2020 |
| KR | 10-0834474 B1 | 6/2008 |
| KR | 10-0936353 B1 | 1/2010 |
| KR | 10-1210065 B1 | 12/2012 |
| KR | 10-2019-0016015 A | 2/2019 |
| WO | 2009/037472 A1 | 3/2009 |
| WO | 2018/125989 A2 | 7/2018 |
| WO | 2018/165386 A1 | 9/2018 |
| WO | 2018/203205 A1 | 11/2018 |

OTHER PUBLICATIONS

"Count", Mojix, Available online at: <https://mojix.com/retail-solutions-suite/count/>, Accessed on May 14, 2020, 2 pages.

"Mojix Builds Real-Time Retail and Supply Chain IoT Platforms with Confluent Cloud", Mojix, Confluent, Available online at: <https://assets.confluent.io/m/32b258fe5c1ec09f/original/20181212-CS-Mojix.pdf?_ga=2.249959238.1794797684.1589466060-1056109458.1589466060>, Dec. 2018, 3 pages.

Giang et al., "Developing IoT Applications in the Fog: A Distributed Dataflow Approach", 5th International Conference on the Internet of Things (IOT), Oct. 2015, 8 pages.

Hansen et al., "RFID for the Optimization of Business Processes", John Wiley & Sons, Ltd., ISBN: 978-0-470-72422-4, Available online at <http://dx.doi.org/10.1002/9780470754160>, Apr. 14, 2008, 286 pages.

Welbourne et al., "Building the Internet of Things Using RFID", IEEE Internet Computing, vol. 13, Issue 3, May 5, 2009, pp. 48-55.

Zheng et al., "Experimental study on developing Internet of Things system over the AWS Cloud", Coinmonks, Available online at: <https://medium.com/coinmonks/experimental-study-on-developing-internet-of-things-system-over-the-aws-cloud-c650343197db>, Jun. 27, 2018, pp. 1-22.

Office Action received for European Application No. 20784255.0, mailed on Sep. 2, 2024, 9 pages.

RADIO FREQUENCY IDENTIFICATION SCANNING USING THE INTERNET OF THINGS

CROSS-REFERENCE TO RELATED APPLICATIONS

This application, entitled "Radio Frequency Identification Scanning Using the Internet of Things," is a continuation of U.S. patent application Ser. No. 18/110,786, filed on Feb. 16, 2023, and entitled "Radio Frequency Identification Scanning Using the Internet of Things," which is a continuation of U.S. patent application Ser. No. 17/532,055, filed on Nov. 22, 2021, and entitled "Radio Frequency Identification Scanning Using the Internet of Things," which is a continuation of U.S. patent application Ser. No. 16/821,696, filed on Mar. 17, 2020, and entitled "Radio Frequency Identification Scanning Using the Internet of Things," which claims priority to U.S. Provisional Patent Application No. 62/829,892, filed Apr. 5, 2019, and entitled, "Radio Frequency Identification Scanning Using the Internet of Things," the entireties of which are incorporated herein by reference.

TECHNICAL FIELD

This disclosure is related to tracking inventory using Radio Frequency Identification (RFID).

BACKGROUND

Consumers often desire to know whether a particular item is in stock at a particular retail location before visiting that location. A manufacturer's ability to answer this question depends on accurate and up-to-date inventory data across its supply chain. If inventory data is inaccurate or outdated, the consumer may be forced to visit numerous retail locations in an effort to find the desired item. This has a negative impact on the consumer experience. Inaccurate and outdated inventory data can also have a negative impact on the manufacturer's operations throughout the supply chain network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein improves a consumer's shopping experience by leveraging granular, low-latency inventory data to inform the consumer whether a desired item is in stock at a particular retail location at a particular time. Such information is provided with a high degree of accuracy. This alleviates the inconvenience of visiting or calling multiple retail stores to ask whether the desired item is in stock.

For example, a consumer may be shopping for a new pair of shoes. The consumer may wish to purchase the shoes in person at a retail store (as opposed to online) for any number of reasons. He may be interested in a new style and may want to see the shoes in person and try them on before purchasing, for example. Or the consumer's interest may be sparked by something he sees in the course of his daily activities. He might notice that someone walking down the street is wearing a pair of shoes that he likes, or he might see an advertisement on a billboard or in a magazine during a commute, and he may wish to see the shoes in person right away. In any event, the consumer may desire to know which local retailers carry the style in his desired color and size at that particular moment in time. A list of local retailers that have the particular item in stock may be communicated to the consumer through a mobile app, such as a mobile app provided by a manufacturer of the shoe. The mobile app may facilitate any number of additional actions, such as putting the item on hold, scheduling a pick-up time, or navigating to one of the retailers. In the example of a consumer whose interest is piqued while walking down the street or during a commute, the app may allow him to put the shoes on hold at a nearby store (either near a current location or along a route to a destination) and direct him there so that he can see, and potentially purchase, the shoes without delay.

This enhanced consumer experience is driven by granular, low-latency inventory data. The data is granular, because it pertains to a specific item (e.g., style, color, size) at a specific location, and it is low-latency, because it reflects the specific location's inventory in real time or near real time. The data must also be accurate to avoid mistakenly telling a consumer that a specific item is in stock at a specific location when, in fact, it is not.

To obtain inventory data that is granular, current, and accurate, an exemplary system leverages RFID technology and aspects of the Internet of Things (IoT) architecture. Among other things, the system may enable faster and more frequent inventory counts across a network of retail locations to provide a comprehensive inventory picture at any given point in time. At a high level, an inventory count may be performed at a retail location by one or more retailer employees utilizing RFID scanners that are communicatively coupled to employee devices (e.g., smartphones). An employee at a retail store location may begin a scanning session by utilizing a scanner to scan RFID tags that are attached to each item in the store. An RFID scanner can quickly read signals from many tags located within about twenty feet of the scanner, so this task may be accomplished in a short amount of time, particularly when multiple employees are working together. An employee device may receive the scan data from the scanner, filter item identification codes from the vast amount of data collected by the scanner, and then bundle the codes into a group message that is sent, using an IoT protocol, to one or more backend servers that perform inventory management functions (e.g., servers controlled by the manufacturer). Location data may also be included in the message to reflect the specific retail store location, as well as whether a particular inventory item is on the sales floor or in the stockroom. Other employees may join the scanning session and may similarly use scanners and employee devices to scan, filter, and bundle item identification codes into a message that is sent via the IoT protocol to the backend servers. As will be discussed in more detail below, the use of the IoT protocol in this context facilitates fast, streamlined communications between multiple employee devices and multiple backend servers.

The backend servers may reconcile the data received from the employee devices (e.g., filter out duplicate scans performed by multiple employees) and compile a current, comprehensive list of each item in the store's inventory. The item identification code data may also be supplemented with enriched product information, such as the style, size, and color of each item, to provide a user-friendly picture of the store's inventory. The backend servers may share the comprehensive inventory list (which may include the enriched product information) back to each employee device so that each employee device has a current inventory list that reflects the scanning performed by all of the employees. The communications between the employee devices and the backend servers may occur in near real time, such that the employee devices receive continuously updated inventory data throughout the scanning session.

Using conventional technology, a full inventory count at just one store may take hundreds of labor hours, thus making it impractical for a store to perform inventory counts more than once or twice per year. In this instance, inventory data may become inaccurate due to product loss, theft, or accounting errors. By contrast, the technology described herein may enable a store to perform a full inventory count in less than 10 labor hours, thus enabling weekly (or even more frequent) inventory counts and ensuring that inventory data is current.

The granular, current, and accurate inventory data collected in the exemplary manner described above improves the consumer experience in a number of ways. For example, as in the scenario described at the outset of this summary, this inventory data may be used to tell a consumer whether a desired item is in stock at a particular retail location at a particular time. The experience of consumers who are already at a particular retail location is also improved. For example, retailer employees are better able to assist customers when the employees have current, comprehensive inventory data. This allows an employee to quickly tell a customer whether a particular style, size, and color is in stock, either on the sales floor or in the stockroom. Additionally, because the inventory data includes specific location information (e.g., sales floor vs. stockroom), it may be determined that there are products in the stockroom that are not currently represented on the sales floor, and corrective action may be taken.

The enhanced inventory data described herein may be gathered and maintained by a manufacturer, and the manufacturer may leverage the data to not only provide the customer experience improvements described above, but also to improve the manufacturer's inventory management and overall operations.

BRIEF DESCRIPTION OF THE DRAWINGS

Aspects of the technology described in the present application are described in detail below with reference to the attached drawing figures, wherein.

DETAILED DESCRIPTION

Figure 1:
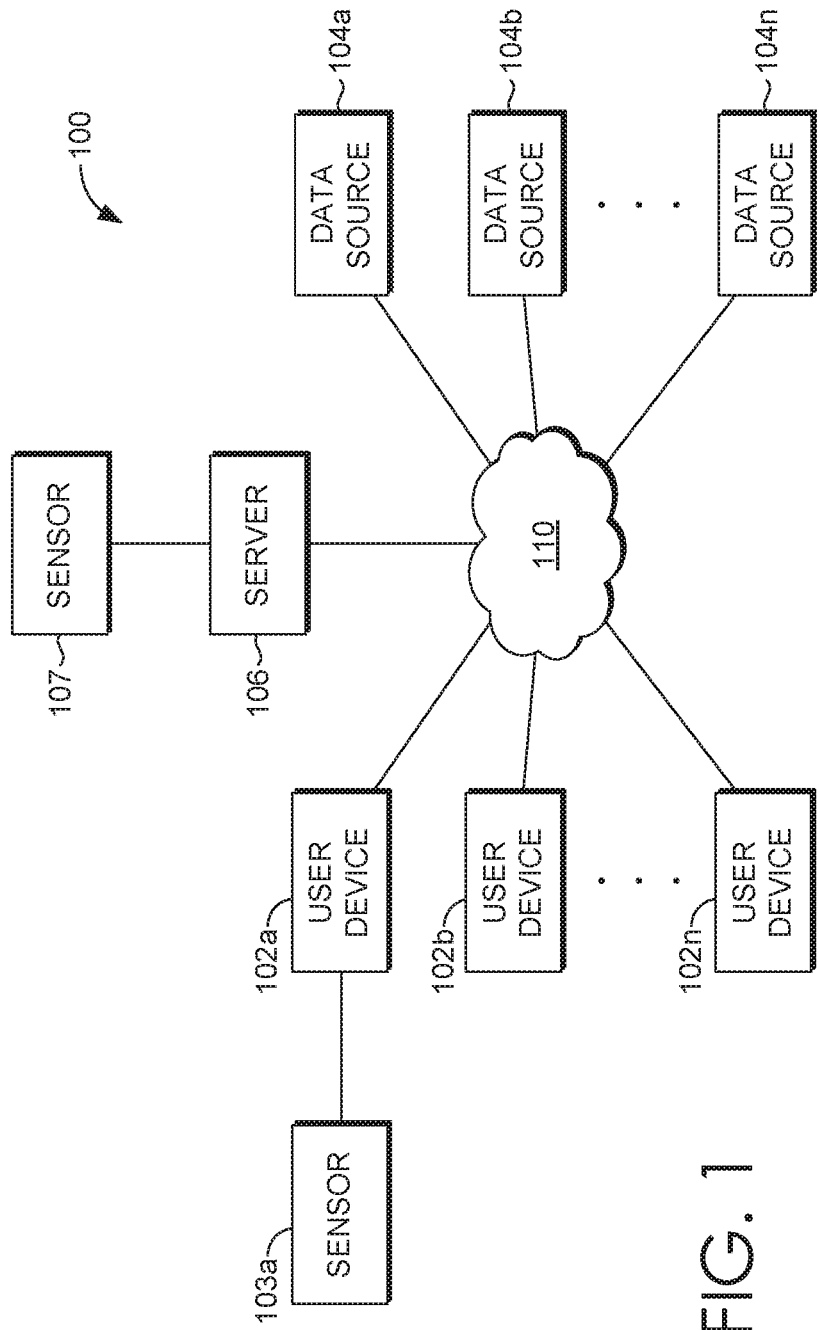
FIG. 1 is a block diagram of an exemplary computing environment suitable for implementing aspects of the technology described herein.

The technology of the present disclosure is described with specificity herein to meet statutory requirements. However, the description itself is not intended to limit the scope of this patent. Rather, the inventors have contemplated that the claimed subject matter might also be implemented in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides for the collection and maintenance of granular, low-latency inventory data throughout a supply chain network. Such data may be leveraged to enhance a consumer's shopping experience, as well as to improve inventory management and overall operations throughout the supply chain.

An exemplary system uses RFID technology and aspects of the IoT architecture to enable faster and more frequent inventory counts across a network of retail locations. In such a system, an RFID tag may be coupled to each inventory item (e.g., the tags may be attached by the manufacturer or another entity in the supply chain before the product is shipped to the retail location). An employee may scan the RFID tags using a handheld RFID scanning device that is communicatively coupled to a user device (e.g., smartphone) operated by the employee. Because RFID tags do not require strict line of sight to be read, the employee need not shuffle items around in order to scan them (e.g., the employee need not move one item in order to access another item that is behind it). Instead, the employee can quickly scan all items located within a certain proximity of the scanner (e.g., twenty feet). Scan data received from a plurality of the RFID tags may be filtered by the user device before being communicated to one or more backend computing systems (e.g., servers that are controlled by a manufacturer and that perform inventory management functions). The scan data may be filtered at various levels of granularity in order to accomplish various inventory outcomes. For example, in a first aspect, a business may desire to have binary inventory information, that is, a determination of whether a product is present or not. Using location information, the presence of an item of that product could equate to an in-stock status (e.g., if the item is in a storeroom) or an on-display status (e.g., if the item is on display). In such a binary inventory aspect, the system may filter an item of the same product type and in the same location as a previously scanned item. As a result of a greater amount of information being filtered out, the system may consume less bandwidth in communicating between the user device and the one or more backend computing systems. In a second aspect, a business may desire to have complete inventory information, that is, a determination of how many distinct items are present in a location. In this instance, the system would not filter out an item that is the same product type as a previously scanned item. However, the system may filter out duplicate codes for the same item to ensure that the same distinct item is not counted more than once.

The filtered and aggregated scan data may be sent to one or more backend computing systems using an IoT protocol, such as Message Query Telemetry Transport (MQTT). This provides numerous advantages. First, IoT protocols, such as the MQTT protocol are an efficient means for communicating limited information in low-bandwidth applications. The system described herein benefits from the use of such a protocol, because it avoids difficulties that come with bandwidth-intense communications and facilitates processing and communicating inventory data in a quick and efficient manner. Furthermore, pursuant to the IoT protocol, a first IoT topic may be used for communications from user devices to backend computing systems (e.g., "subscribed information"), and a second IoT topic may be used for communications from the backend computing systems to the user devices (e.g., "published information"). Sending the aggregated scan data to a single IoT topic for the backend computing systems avoids complications in communication between user devices and backend computing systems, particularly when more than one user device is being used to complete the inventory. Additionally, using two different IoT topics for subscribed and published information avoids confusion between information flowing from the user devices to the backend computing systems and information flowing in the opposite direction.

The aggregated data communicated to the backend computing systems may also include location information relating to the location of the scanned item. Such information may be used, for example, in determining whether an item is in a showroom or in a stock/storage area. In other aspects, the location information may be used to determine where an item is located in said area. Location information for a scanned item may be determined based on the location of the user device when the item is scanned. The location of the user device may be manually input (e.g., by a user's interaction with a user interface of the user device), automatically obtained using one or more components of the user device (e.g., GPS), or determined based on a scanned location tag. Once the user device's location is known, an item's gross location may be determined to be the location of the user device (e.g., in a showroom or in a stockroom), or the item's fine location may be determined based on information known to the user device (e.g., using the user device's location, a line of bearing, and signal strength from the RFID tag).

Following the communication of the scan data to the one or more backend computing systems, enriched product information may be published to the user device by the backend computing systems using a second IoT topic. By providing feedback to the user device being used to complete the inventory, an employee using the user device will be empowered with near-real-time information regarding which items have been scanned and which items have yet to be scanned.

In order to further decrease the time necessary for performing an inventory, a team scanning system may be used. In such a system, a scanning session may be initiated by a first user device, the creation of the scanning session may be broadcast to a second user device, and the second user device may be permitted to join the scanning session. As part of initiating the first session, a first IoT topic may be assigned to all scan data to be passed to the one or more backend computing systems during the scanning session. That is, after a first user device receives scan data for a first distinct RFID tag and a second user device receives scan data for a second distinct RFID tag, each of the first and second user devices may communicate item identification codes (IICs) corresponding to their respective scans to the one or more backend computing systems using the first IoT topic. An inventory list or record may be created and maintained by the one or more backend computing systems and communicated to every user device participating in the scan session so that each user device has visibility as to which items have been scanned and which have yet to be scanned. The communicated IICs may be appended to a session inventory list, which may be communicated back to the user device of each of the first and second employee. When either employee scans an RFID tag that has not been scanned in the first session, according to the session inventory list, a user-perceivable feedback (e.g., an audible or tactile indication) may be provided, signaling to the user of the user device that new items, and thus new IICs, are still being detected. In this way, multiple employees may simultaneously contribute to the completion of a single inventory session.

In order to provide the granularity of information desired by businesses and customers, each RFID tag may be configured to communicate particular information. For example, if a business wishes to track each serialized product individually, the RFID may be configured to communicate a Serialized Global Trade Identification Number (SGTIN) or Electronic Product Code (EPC) to the scanning device. In aspects, if a business desires less granular inventory data, such as a quantity of a particular type of product that is in stock, the RFID may be configured to communicate a Global Trade Identification Number (GTIN) or Universal Product Code (UPC). For example, using a GTIN, a business may determine that it has one pair of quarterback shoulder pads in stock (without regard to its condition). The customer may be seeking any pair of said shoulder pads and visit the store based on known availability. Using more granular information, such as an SGTIN, a business may perform a complete inventory and determine that it has one pair of used quarterback shoulder pads in stock, but none "new in box." In this example, a customer may be searching for only new-condition pads and opt not to visit the store. In either example, it may be determined that the shoulder pad stock needs to be replenished. Thus, customers are provided a more up-to-date and informed shopping experience and various entities in a supply chain are enabled to make faster and better-informed logistics decisions.

Conventional solutions have numerous shortcomings. For example, traditionally, a retailer may use an optical (e.g., 2D barcode tags) inventory system in order to complete an inventory of the items in a particular location. Optical inventory systems require true line of sight between a reader and the optical tag (e.g., no non-transparent barrier may separate the reader from the optical tag). The scanning equipment must be clean, the marking must be clear and clean, and the scanner must be positioned head on. In retail locations where items are stacked and/or faced (e.g., arranged such that some inventory of an item may be behind a customer-facing item), a complete inventory using optical systems would require an employee to move each and every item to be sure that no items are behind a customer-facing item. Because items must be individually scanned (and often times moved), optical-based inventories take a significant number of labor hours to complete. Accordingly, optical-based inventories may only be completed monthly, semi-annually, or annually, depending on the number of items in the inventory. Further, team inventories may be inefficient when employees on the team are unaware of which items have previously been scanned. Accordingly, such optical-based inventories may be high-latency, which may inhibit stocking decisions and erode the customer experience. For example, a customer may be informed that, based on the latent inventory and subsequent point of sale (POS) transactions, a particular item is in stock at a retail location when it is not. For example, a customer may be seeking a particular pair of running shoes in size 10. Based on the latent inventory and subsequent POS transactions, a retailer may believe it has one pair of the shoes in stock; however, the retailer is unaware that said pair of shoes was stolen a week prior. The customer may have a negative experience when he arrives at the retailer and discovers that the desired pair of shoes is not actually in stock.

Using a conventional RFID inventory system may solve some of the difficulties associated with the optical inventory systems. For example, RFID scanners do not require a clear line of sight. However, using RFID may result in additional problems. RFID enables the scanning of lots of RFID tags at once, which may increase efficiency in human operations, but may result in a vast amount of data that takes a very long time to communicate and process by various computing systems. Additionally, team inventories may be difficult because teammates may not know which RFID tags have been scanned. Whether the result of team scanning or the result of the deluge of information produced by scanning a plurality of RFID tags, RFID inventory systems may experience significant duplication, and thus be inaccurate. That is, even though conventional RFID technology may expedite human operations, the associated computer operations may still suffer from inefficiency and high latency (e.g., due to the significant amount of data and the high bandwidth needed for communications), and the data may be inaccurate.

Aspects of the technology described herein solve the problems described above by facilitating the collection and maintenance of granular, low-latency inventory data. The latency of inventory data may be reduced in a number of ways. First, RFID technology may be leveraged to quickly scan all inventory items in a matter of hours (as opposed to hundreds of hours using optical scanning technology). Then, the vast amount of data provided by the RFID tags may be filtered down to the specific data needed for a particular inventory application before being communicated to backend computing systems. This filtering reduces the amount of data that is communicated between user devices and backend systems, thus requiring less bandwidth and making communications faster and more efficient. And as described above, the type of data and amount of data that is communicated may be tailored to particular inventory applications. For example, less data may be needed to provide an "in stock"/"out of stock" assessment, while more data may be needed to track each individual item of inventory. Thus, aspects hereof communicate only as much information as is needed for particular inventory applications, thereby optimizing the efficiency of communications.

The technology described herein also provides improved efficiency and streamlined communications by leveraging aspects of the IoT architecture. As described above, IoT protocols, such as the MQTT protocol, are an efficient means for communicating limited information in low-bandwidth applications. Additionally, sending all aggregated scan data collected by user devices to a single IoT topic for the backend computing systems streamlines communications, particularly when multiple user devices are participating in a scan session. Furthermore, utilizing two different IoT topics for subscribed and published information avoids confusion between information flowing from the user devices to the backend computing systems and information flowing in the opposite direction.

Aspects of the technology described herein also facilitate team inventory efforts, thus making inventory counts even faster and more efficient. For example, the IoT architecture is leveraged to streamline communications between multiple user devices and backend computing systems. Additionally, the backend computing systems reconcile the data received from multiple user devices and provide comprehensive inventory data back to each user device, thus ensuring that each user device has a current inventory picture that is derived from the data collected by all user devices. User devices are provided near-real-time feedback regarding which items have not yet been scanned, thus making it easier for multiple employees to collaborate on the inventory count.

Additionally, the technology described herein provides not only for the collection and maintenance of granular, low-latency inventory data throughout a supply chain network, but also for leveraging such data to enhance a consumer's shopping experience. As illustrated by the examples above, this data enables an entity, such as a manufacturer, to accurately inform a consumer whether a desired item is in stock at a particular retail location at a particular time. The data also enables retail stores to serve customers more quickly and efficiently (e.g., by quickly telling a customer whether a particular style, size, and color is in stock, either on the sales floor or in the stockroom), thus enhancing a customer's in-store experience. For example, the inventory data communicated to employee devices may be supplemented with enriched product data (e.g., style, size, color) to provide a user-friendly picture of a store's inventory. The granular, low-latency inventory data also allows a manufacturer to improve its inventory management and overall operations, which ultimately results in an improved customer experience.

Accordingly, aspects of the technology described herein provide for an improved inventory tracking system using RFID. The efficiency and accuracy of completing an inventory may be significantly increased by filtering erroneous and/or duplicate data. Further efficiency gains may be achieved through the ability of multiple user devices to join a single scanning session and communicate their scanned data using a common IoT topic. Users of the user devices may be provided enriched product feedback that, via a GUI, provides increased situational awareness during the scanning session. The numerous improvements to inventory tracking may satisfy the need to provide low-latency inventory solutions that are beneficial to businesses and consumers.

Having briefly described an overview of aspects of the technology described herein, an example operating environment suitable for use in implementing the technology is now described. With reference to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location.

Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that operating environment 100 shown in FIG. 1 is an example of one suitable operating environment. Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be implemented as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106.

Figure 2:
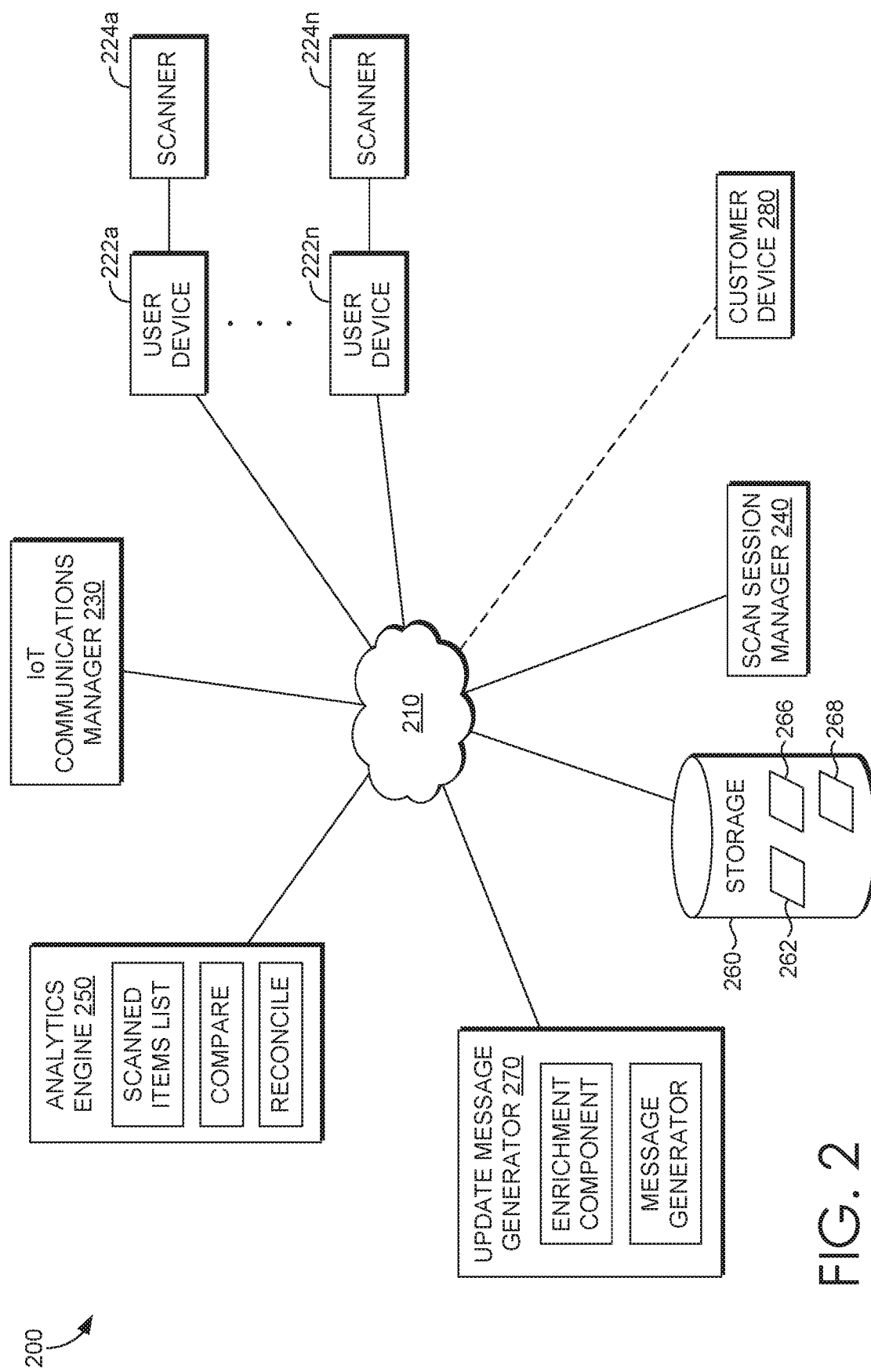
FIG. 2 is a diagram depicting an example computing architecture suitable for implementing aspects of the technology described herein.

Operating environment 100 can be utilized to implement one or more of the components of system 200, described in FIG. 2, including components associated with the user device 222a, IOT communications manager 230, scan session manager 240, analytics engine 250, update message generator 270, and customer device 280. Referring now to FIG. 2, with FIG. 1, a block diagram is provided showing aspects of an example computing system architecture suitable for implementing an aspect and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. Further, though each element is described herein as a discrete functional entity, any one or more of said entities may be collocated and/or performed by a shared processor executing multiple processes.

Example system 200 includes a user device 222a, IOT communications manager 230, scan session manager 240, analytics engine 250, update message generator 270, and customer device 280, each of which may be implemented via any type or number of computing devices, such as computing device 900 described in connection with FIG. 9, or user devices 102a through 102n or server 106 described in connection with FIG. 1. For example, user device 222a through 222n and customer device 280 may each correspond to one or more of user devices 102a through 102n. As used herein, the term "backend computing device(s)" may be used to collectively refer to any one or more of the IOT communications manager 230, scan session manager 240, analytics engine 250, update message generator 270. As such, any one or more backend computing devices may correspond to one or more of user device 102a through 102n or server 106. Storage 260 may comprise memory, a computer data store, database, cloud-/distributed-storage, or the like, and may correspond to one or more data sources such as data source 104a. In one aspect, storage 260 or a portion thereof may be implemented using a distributed ledger, such as a blockchain. As mentioned above, any one or more of the user device 222a, IOT communications manager 230, scan session manager 240, analytics engine 250, and update message generator 270 may be part of the same computing device or computing system. In other words, as described with respect to FIG. 1, each component depicted in FIG. 2 may comprise a single device or multiple devices cooperating in a distributed environment. Each of the user device 222a, IOT communications manager 230, scan session manager 240, analytics engine 250, and update message generator 270 may include, running thereon, one or more computing software applications or apps that facilitate performance of the operations described herein in connection with these devices. The components depicted in FIG. 2 are communicatively coupled via one or more networks, such as network 110 described with respect to FIG. 1. For example, the components may be coupled via the Internet, a cellular or wireless communications network, a private network, a virtual private network (VPN), a virtual private cloud (VPC) network, any other network, or any combination of the foregoing. Furthermore, although the lines in FIG. 2 indicate that certain components are communicatively coupled to one another, it is understood that these lines are non-limiting. For example, the IOT communications manager 230 may be communicatively coupled with the scan session manager 240.

System 200 is associated with inventory tracking using RFID. In one aspect, the system 200 may be implemented by a retailer, such as a retailer of shoes. The retailer may have a number of different types of shoes in different sizes and colors, for example, available for display at a retail location for potential customers. The retailer may further have a stock of various shoes in a stockroom, which, until accessed by an employee of the retailer, may not be readily available to the potential customers. As mentioned above, in one aspect, it is important for the retailer to know which shoes are on display; in a second aspect, it is important for the retailer to know how many of each shoe is in stock. Further, it is important for potential customers to know that a particular shoe is available at a particular retail location in order to prevent the trial and error approach that can dissuade potential customers from soliciting brick-and-mortar retail locations. Accordingly, the system 200 provides for an improved low-latency inventory tracking system that facilitates more efficient retail logistics for the retailer and an improved shopping experience for the customer.

The system 200 may be said to comprise a user device 222a. User device 222a may correspond to a user device, such as user device 102a of FIG. 1. In one aspect, the user device 222a may be a mobile device, such as a smart phone, tablet, laptop computer, or the like, executing one or more applications or apps thereon. To begin to use the system 200, the user device 222a may locally initiate a first scanning session. In other aspects, the user device 222a may provide an indication to the one or more backend computing devices, such as the scan session manager 240, that the user device 222a wishes to have a first scanning session initiated. Whether the first scanning session is initiated by the user device 222a or one or more of the backend computing devices, concurrent with the creation of the scanning session, a first IoT topic will be assigned to subscribed messages (messages from the user device to the one or more backend computing devices) communicated during the scanning session, and a second IoT topic will be assigned to published messages (messages from the one or more backend computing components to a user device in the scanning session), wherein the first IoT topic is different than the second IoT topic.

The user device 222a may be coupled to a scanner 224a. In some aspects, the user device 222a may be communicatively coupled to the scanner 224a; in other aspects, the user device 222a may be physically coupled to the scanner 224a, or the user device 222a and the scanner 224a may be a single device. The scanner 224a may be any device capable of providing RFID scan data to the user device 222a. That is, the scanner 224a may propagate an RF signal that is used to activate a passive RFID tag, triggering the return of RFID scan data therefrom. In other aspects, the scanner 224a may comprise one or more receive elements configured to receive RFID scan data transmitted from an active RFID tag The scanner 224a may comprise one or more antennas that may be used by the scanner 224a to determine a line of bearing between a read RFID tag and the scanner 224a. The scanner 224a may also use the one or more antennas to determine a signal strength of the RFID scan data, which may be used by either the scanner 224a or the user device 222a to estimate a distance between the scanner 224a and the read RFID tag. As seen in FIG. 2, the system 200 may comprise a single user device 222a and a single scanner 224a, or a plurality of user devices 222a through 222n and an equivalent number of scanners 224a through 224n.

The user device 222a may be configured to determine and associate location information with information about an item communicated to the one or more backend computing devices. In one aspect, a device location may be determined manually by providing a prompt or selectable option on a user interface of the user device 222. In another aspect, the device location information may be determined automatically using components or capabilities of the user device 222a and/or the scanner 224a (e.g., location provided by a GPS component or triangulation based on signals received from known locations). In yet other aspects, the device location may be determined semi-automatically by using the scanner 224a to scan a location RFID tag, wherein the location RFID tag is associated with a location known to the system 200 or the user device 222a. Device location information may be any degree of course or fine. For example, a coarse location may be a high-level location, such as stockroom vs. showroom or warehouse vs. in transit. A fine, or finer, location may be a more specific location, such as "Nike Men's Basketball Shoes" or "Women's Running Shoes."

Once the device location is determined, it may be communicated to one or more of the backend computing devices, such as the IoT communications manager 230, along with information that identifies the item based on the RFID scan data. In some aspects, an item location may be determined based on any one or more relationships between a location RFID tag and an item RFID tag. The relationship may be positional, that is, the scanner 224a may communicate to the user device 222a that a location RFID tag has been detected within a threshold proximity to an item RFID tag. For example, the location RFID tag may be detected as having an azimuth of 019 degrees relative and an elevation of +10 degrees and an item RFID tag has been detected having an azimuth of 020 degrees relative and an elevation of +12 degrees. If the 1 degree difference in azimuth and 2 degree difference in elevation is within the predetermined threshold, the item associated with the item RFID tag may be determined to have the location of the location RFID tag. The relationship may be temporal. That is, a location could be assigned to an item associated with an item RFID tag when it is scanned within a predetermined threshold amount of time of the location RFID tag being scanned. For example, a location RFID tag may be scanned at 4 seconds before the item RFID tag is scanned. Based on that amount of time being less than the predetermined threshold, it may be determined that the item associated with the item RFID tag is located at the location associated with the location RFID tag. The relationship may also be based, at least in part, on one or more characteristics of the reply from each of a location RFID tag and an item RFID tag. For example, a signal strength of the respective replies could indicate that the location RFID tag and the item RFID tag are at a similar range from the scanner 224a (based on the reply signal strengths being within a predetermined threshold, e.g., 10% or 5 dbm).

The user device 222a may convert RFID scan data provided by the scanner 224a into a set of IICs, wherein the set of IICs may comprise one or more IICs. As used herein, RFID scan data may refer to any code, number, sequence, or the like, configured to be provided by an RFID tag (whether from a passive RFID tag, in response to being activated by the scanner 224a, or from an active RFID tag). Non-limiting examples of RFID scan data include a Global Trade Identification Number (GTIN), a Serialized GTIN (SGTIN), Electronic Product Code (EPC), or the like. An IIC may be any code, number, sequence, or the like, for positively identifying a particular item at a predetermined level of granularity. Using the example of the shoe retailer, a unique IIC may correspond to Air Jordans generally, size 10 Air Jordans, or red size 10 Air Jordans. In one example, the scanner 224a may scan an RFID tag and receive a response from the RFID tag comprising RFFID scan data comprising a sequence of 123456654321, which may be a 12 digit GTIN. The scanner 224a may communicate the RFID scan data to the user device 222a, at which point the user device 222a may perform filtering operations using said RFID scan data.

The user device 222a may perform different filtering operations depending on what type of inventory operation is being conducted. As mentioned above, the inventory system 200 may be used to carry out a binary inventory or a complete inventory, for example. When used to carry out a complete inventory, the system 200 may be attempting to know how many of a particular item are present at a particular location. A complete inventory may be useful for a retailer in determining how many copies of a particular IIC are available in a stockroom. That information may be of particular value when making ordering/purchasing decisions. When used to carry out a binary inventory, the system 200 only cares to know whether or not a particular item is present at a particular location. A binary inventory may be useful for retailers to efficiently utilize showroom space. In other words, a retailer may not desire to have multiple copies of the same item taking up limited showroom space. The binary inventory may also be useful for customers that are trying to determine whether or not the particular item is in stock at the retail location, which may be dispositive in the decision of whether or not they should visit the retail location on a quest to purchase said particular item.

When the system 200 is used to perform complete inventory operations, the user device 222a may filter RFID scan data by de-duplicating a received first plurality of RFID scan data. Deduplication (aka deduping) is used to prevent a single RFID tag from being counted twice. In aspects where a complete inventory is desired, the RFID tag coupled to each discrete item should reply to the scanner 224a with unique RFID scan data. In order to do this, each item RFID tag should be configured to provide sufficient detail. In aspects, this may be achieved by configuring each item RFID tag to reply with an SGTIN or EPC upon being queried by the scanner 224a. In one aspect, the scanner 224a may provide deduping filtering by only communicating a first RFID scan data to the user device 222a once per scanning session, wherein the first RFID scan data is associated with a first item RFID tag. For example, if the scanner 224a propagates a query once every second, it is very likely that the query from the scanner 224a will trigger a reply from the first item RFID tag multiple times (i.e., before the first item RFID tag is no longer within the propagation pattern of the scanner's 224a transmitting and/or receiving antenna(s)). By deduping the RFID scan data, the first item RFID tag is only counted one time, instead of once for every time a reply from said tag is received by the scanner 224a. In another aspect, the scanner 224a may communicate all received RFID scan data to the user device 222a (i.e., the first RFID scan data may be communicated to the user device 222a multiple times in a single scanning session). In such an aspect, the user device 222a may perform deduping of the communicated RFID scan data in the same manner described above.

When the system 200 is used to perform binary inventory operations, the user device 222a may filter RFID scan data by filtering out similar RFID scan data from different item RFID tags, in addition to performing deduping. In such an aspect, a second item RFID scan data may be filtered out if it is determined that a second item correlating to the second item RFID scan data has the same item IIC as a first item correlating to a first item RFID scan data. Because an item code may only be counted once, regardless of how many copies are scanned, item RFID tags may be configured to comprise a GTIN, SGTIN, EPC, SKU, UPC, or the like. For example, during a binary inventory scanning session, a user device 222a may receive a first RFID scan data for a red pair of size 10 Nike Air Jordans and a second RFID scan data for a black pair of size 10 Nike Air Jordans. In this example, the retailer may have specified that the desired granularity for unique IICs is a make, model, and size. Accordingly, the user device 222a may determine that the red pair of Air Jordans and the black pair of Air Jordans have the same IIC and the user device 222a may filter out the second RFID scan data, yielding an outcome where the retailer is provided with information that at least one pair of size 10 Nike Air Jordans are in a particular location.

In addition to filtering RFID scan data, the user device 222a may provide an aggregation function. Upon receiving a first IIC for a first item, the user device 222a may determine a product identifier corresponding to the first IIC. For example, the IIC may be a code, sequence, or number, and the user device 222a may determine that the IIC equates to a product name (e.g., IIC 1234554321 may equate to size 10 Nike Air Jordans). The user device 222a may then create an aggregated product identifier comprising the product identifier and the first IIC, which may be communicated to the one or more backend servers in a first message, using the first IoT topic.

Subsequent to filtering the received plurality of RFID scan data or subsequent to the filtering and aggregating, the user device 222a may communicate the first message comprising a first group of one or more IICs to one or more backend computing devices. Because the first message may be sent at some time period after a previous message or before a second message, the first message may comprise multiple IICs that have been filtered by the user device 222a since the last message. Once the first message has been generated, it may be sent to the IoT communications manager 230 according to an IoT protocol, such as MQTT, using the first IoT topic.

The IoT communications manager 230 may communicate the first message to the analytics engine 250. The analytics engine 250 may comprise one or more functional components that receive and/or generate a scanned items list, compare the scanned item list to an inventory record 262, and reconcile the scanned items list and the inventory record 262 to update the inventory record 262. In aspects, the inventory record 262 may be one or more records that correspond to one or more sessions and/or at one or more locations. In one aspect, the analytics engine may create the scanned items list by combining a first set of IICs communicated by a first user device and a second set of IICs communicated by either the first user device or a second user device that has joined the scanning session. For example, if the first user device communicates a first IIC among the first set of IICs and the second user device communicates a second IIC among the second set of IICs, the analytics engine 250 may create a scanned item list that comprises the first IIC and the second IIC. The analytics engine 250 may also perform filtering/deduping operations on the first and/or second group of IICs in order to create the scanned item list. For example, if the first user device communicates a first IIC among the first set of IICs and the second user device also communicates the first IIC among the second set of IICs (this could happen if the first IIC is identified by the second user device before the first IIC has been communicated to the one or more backend computing devices from the first user device and/or before the inventory record has been communicated to the second user device comprising the first IIC.) In another aspect, the analytics engine 250 may apply a filter to the first and/or second group of IICs to target specific information (e.g., it may be desirable to only perform an inventory for products related to basketball) according to one or more rules 268 accessed on storage 260. In any aspect, the scanned item list may then be compared to an inventory record 262 obtained from storage 260. As described previously, in one aspect, at least some portions of storage 260 may be implemented on a distributed ledger, such as a blockchain. Accordingly, inventory record 262 may be stored on a distributed ledger, which may comprise a public or private blockchain system. In the event that the scanned items list comprises the very first group of IICs communicated to the one or more backend computing devices, the scanned item list may be used to create a new inventory record 262, the inventory record 262 being the running tabulation of filtered and/or aggregated IICs communicated to the one or more backend computing devices. By comparing the scanned items list to the inventory record 262, the analytics engine 250 may identify IICs that have been communicated for the first time during the scanning session, reconcile the two, and update the inventory record 262.

The analytics engine 250 may additionally or alternatively create one or more comparative inventory reports. The analytics engine 250 may obtain an inventory record 262 from one or more locations of storage 260 in order to compare a first inventory at a first location to a second inventory at a second location, wherein the first location is different from the second location. The comparative inventory report may be stored on storage 260 for subsequent access and/or may be communicated to a user device, such as user device 222a. For example, a first inventory may be performed in a first scanning session, wherein the scanning session is specific to the storeroom/stockroom/back of a store. A separate second inventory may be performed in a second scanning session, wherein the scanning session is specific to the showroom/display area/front of the store. A comparative inventory report may be generated using the first and the second inventories that identifies items that are in stock (i.e., available in the back of the store) but are not on display (i.e., not available in the front of the store). Said comparative inventory report may be communicated to a user device, such as the user device 222a, or a notification may be provided to the user device that specifically identifies a list of one or more items that need to be stocked in the front of the store, based on the comparative inventory report.

Once the inventory record 262 has been created or updated by the analytics engine 250, the update message generator 270 may enrich and/or communicate the inventory record 262 to the user devices in the scanning session, via the IoT communications manager 230. The update message generator 270 may include an enrichment component that may enrich the feedback provided to the user device(s) in the scanning session by appending the inventory record 262 with additional item information 266 obtained from storage 260. For example, the enrichment component may obtain item information 266 specific to an item of the inventory record 262 that comprises an image/representation, description, or other information relating to the item beyond the item name and IIC. If the update message generator 270 performs the enrichment function, the enriched item information may be communicated to the user device(s) of the scanning session via the message generator component. If the enriched item information component is not utilized, the update message generator 270 may communicate the inventory record 262 to the user device(s) of the scanning session via the IoT communications manager 230, according to an IoT protocol such as MQTT, using the second IoT topic. For example, in a team scanning session where each of a first user device and a second user device are performing inventory scans on the same, first session, the IoT communications manager 230 will communicate the entire inventory record to each of the first and second user devices using the second IoT topic, regardless of whether the individual entries on the inventory record 262 originated from the first user device or the second user device.

The user device 222a and any other user devices that have joined the scanning session receives the inventory record 262 and utilizes it during the scanning session and/or during a subsequent scanning session to perform filtering operations, including any filtering operation discussed herein (e.g., comparing new RFID scan data and/or a new IIC against the inventory record 262 to determine whether a particular item/IIC is new or had been previously scanned). In one example, the user device 222a may be said to be a first user device, and a second user device 222n may have joined the scanning session. In addition to performing the functions previously described with respect to the user device 222a, the second user device 222n may be configured to determine a second set of IICs from a second plurality of RFID scan data and filter the second plurality of RFID scan data to filter out any IICs previously scanned by the first user device and communicated to the second user device in the inventory record 262. For example, the second user device may be informed by the one or more backend computing devices that a first IIC has been identified based on RFID scan data processed by a different user device of the scan session or by the same user device at an earlier time in the scan session. If the second user device identifies that the second set of IICs comprises the first IIC, the second user device may ignore (i.e., filter out, not include, or not use) the first IIC and/or a portion of the second plurality of RFID scan data corresponding to the first IIC. In some aspects, the user device 222a may provide perceptible feedback to a user associated with the user device 222a when an RFID scan data is new, relative to the inventory record 262, that is, when the user device 222a determines that an IIC should not be ignored/filtered as described above. The feedback may be auditory (e.g., a beep), visual (e.g., a newly scanned IIC is displayed on the user interface, tactile (e.g., a vibration), or the like. In this way, a user performing the inventory can determine whether there continues to be new RFID tags to scan or if all RFID tags have already been communicated and added to the inventory record 262.

Figure 8:
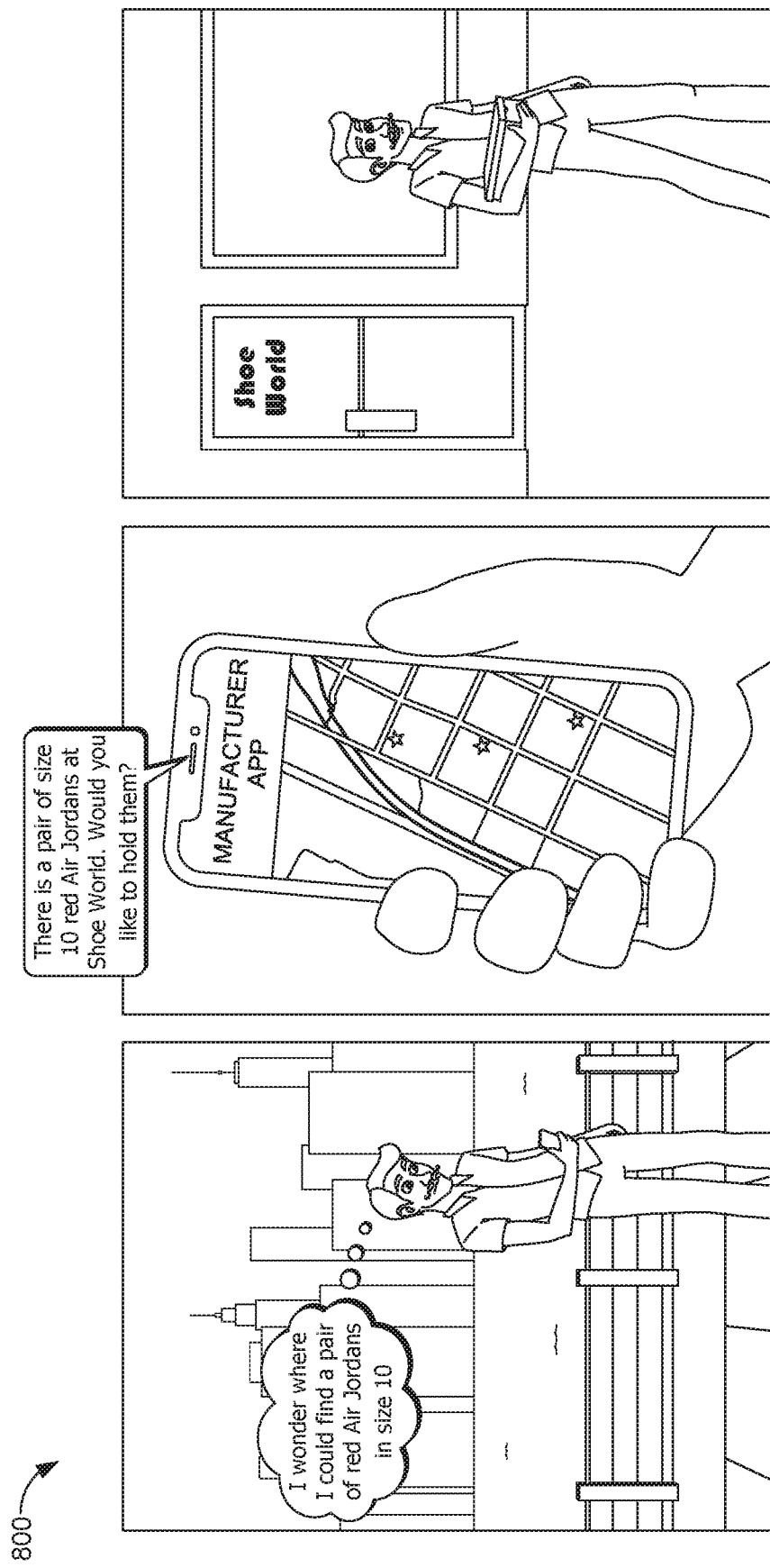
FIG. 8 illustrates a series of exemplary interactions in a retail context, in accordance with aspects of the technology described herein.

In some aspects, the system 200 may further be said to comprise at least one customer device 280. The customer device 280 may be associated with a prospective or actual customer, who would like to determine whether a particular item is available (i.e., on display or in stock) at a particular location. In one aspect, the customer device 280 may query storage 260 and receive the inventory record 262 in response. In another aspect, the customer device may query storage 260 to determine if a specific item is available at a particular location. In response, storage 260 may query the inventory record 262 to search for the particular item and return relevant inventory results therefor. Location information may be communicated to the customer device 280 at a variety of levels; for example, the location information may inform the customer that the desired item is available at Shoe World, located at 123 Main St, it may inform the customer whether the desired item is on display or just in stock (useful if a customer wishes to interact with a display of the item prior to making a purchase decision), or it may inform the customer that it is in stock available at shelf location A21, located in bay 2 of aisle 5. Regardless of the granularity of location information provided to the customer device, the customer is provided with an improved low-latency inventory status that may encourage patronage or improve the customer experience. An example is depicted in FIG. 8, where a prospective customer may be seen using a mobile device (e.g., customer device 280) to determine where a particular item (red Nike Air Jordan, size 10) may be obtained. The mobile device may use an app, such as an app affiliated with a manufacturer or retailer, to query any one or more components of system 200, such as the inventory record 262 on storage 260, to determine if the particular item is located at a certain location or to determine the nearest available location. In the example, the mobile device may receive an indication that the particular item is available at the local Shoe World retail location and display a corresponding indication to the user using the manufacturer app, via the device's user interface. The prospective customer may visit the Shoe World location confident in the improved low-latency inventory information and view/purchase the particular item, as illustrated. Being armed with improved low-latency inventory information may significantly improve the customer experience and convert a prospective customer into an actual customer.

Figure 3:
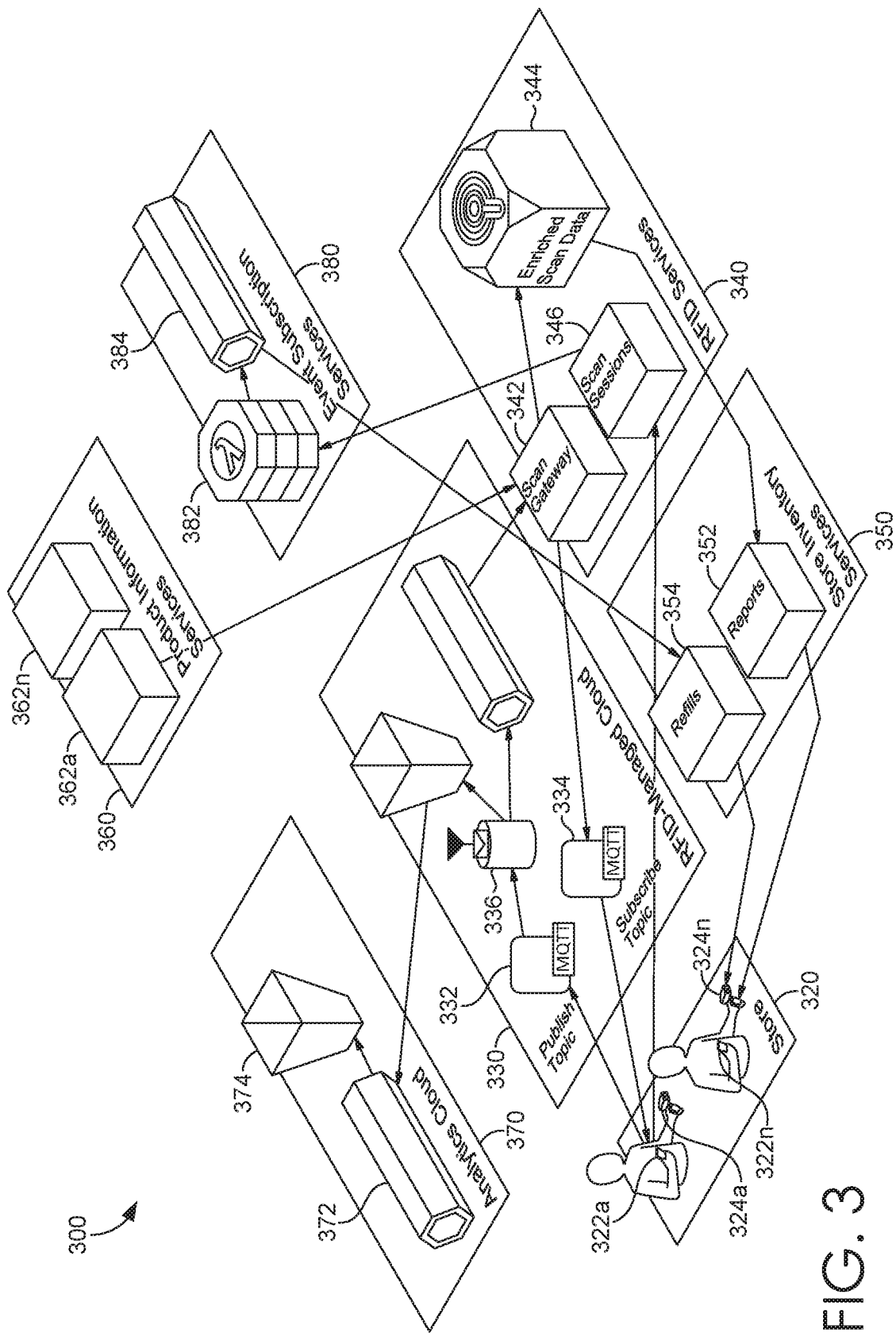
FIG. 3 is a diagram depicting an example computing architecture suitable for implementing aspects of the technology described herein.

As illustrated by the examples and discussions above, various components may be utilized to perform a method for RFID tracking that improves on conventional inventory management practices. In addition to the exemplary architecture of FIG. 2, FIG. 3 depicts an exemplary computing architecture where the components may be similar to certain components discussed above in conjunction with earlier figures.

First, exemplary aspects of a system for performing RFID tracking will be described with reference to the exemplary architecture 300 in FIG. 3. The system 300 may be understood to be structured in a grouped architecture, wherein the system may be said to comprise a store group 320, RFID managed cloud 330, an RFID services group 340, a store inventory services group 350, a product information services group 360, an analytics cloud group 370, and an event subscription services group 380. Though termed "groups," each "group" may be a collection of computing devices, a single computing devices with modules thereon, or a module of one or more backend computing devices, or any combination thereof. In an aspect, members of a group are cloud entities in a cloud architecture performing the functions of a client or a server appropriately within a cloud Internet of Things (IoT) architecture. IoT architectures may include, for example, Amazon Web Services IoT service or Google Cloud IoT.

The store group 320 may correspond to a physical retail location, for example, and may comprise one or more user devices, such as a first user device 322*a* through an Nth user device 322*n*, wherein each of the user devices 322 comprises any one or more features of the user device 222*a* of FIG. 2. The term "store" as used in the phrase "store group" is not meant to be limiting and may be understood to include users who are employed or contracted by a manufacturer, a retailer that is selling items and any of the retailer's employees or contractors, or any other third-party and any of the third-party's employees or contractors. The store group 320 may further comprise one or more scanners 324*a* through 324*n*, wherein each scanner comprises any one or more features of the scanner to 224*a* of FIG. 2. In aspects, the user device 322*a* may request a scanning session be initiated by communicating to scan session component 346. In order to create the scanning session, the scan session component 346 communicates with an event subscription computing device 382 to initiate the scanning session and assign a first IoT topic for subscription information and a second IoT topic for publication information. In one aspect, a message broker in the managed cloud service 330 supports MQTT over a WebSocket protocol, and the clients that employ MQTT also use the WebSocket protocol. In one aspect, a topic hierarchy simply comprises StoreMSessionID\. The event subscription stream 384 receives the session initiation information from the event subscription computing device 382 and communicates it back to the user device 322*a* via one or more backend computing devices, such as the refills component 354 of the store inventory services group 350.

Once the scanning session has been initiated, the user device 322*a* may receive a first plurality of RFID scan data from a first scanner 324*a* as discussed with respect to the user device 222*a* and scanner 224*a* of FIG. 2. The user device may perform any one or more filtering or aggregation functions, as described with reference to FIG. 2, and generate a first message comprising a first group of one or more IICs. The user device 322*a* may communicate the first message to the publish topic component 332 according to an IoT protocol, such as MQTT, and using the first IoT topic. The publish topic component 332 may communicate the first message to the business rules engine 336, which, when active, may apply any one or more backend filtering processes, such as those discussed with respect to the analytics engine 250 of FIG. 2. For example, it may be desirable that a particular inventory be confined to a particular topic (e.g., Men's Basketball) in order to specifically determine an inventory of products that may be particularly relevant to a particular business interest (e.g., when a college basketball tournament is taking place near the store). In such an example, indications of products that bind to a certain category may be processed in the scan session, and indications of other products may be ignored. In particular, in one aspect, a backend service may receive a category description as a taxonomy of GTINs or as a list of interesting GTINs, and the service counts those within a subset of the taxonomy or within the list as binding to the product category. Whether active and communicating backend-filtered IICs or inactive and communicating all IICs received from the publish topic component 332, the business rules engine 336 may store or directly communicate the group of IICs to one or more of the analytics cloud group 370 and the scan gateway component 342 of the RFID services group 340. Data from the business rules engine 336 also may be persisted into a data stream 372 for in-store reports. For example, the data stream may comprise a Kinesis stream or Kafka stream.

The scan gateway component 342 may provide immediate feedback to the user device(s) 322*a* through 322*n* or may additionally receive item information from one or more storage components 362*a* through 362*n* associated with an IIC of the group of IICs. In a first aspect, the scan gateway component 342 may determine a scanned item list, compare the scanned item list to an existing inventory, and create a reconciled inventory record, as described with respect to any one or more features or components of the analytics engine 250 of FIG. 2. The reconciled inventory record may be communicated to a subscribe topic component 334, which may communicate the reconciled inventory record to any one or more user devices 322a through 322n of the store group 320 according to the MQTT protocol and using a second IoT topic. Additionally or alternatively, the scan gateway component 342 may communicate the item information and/or group of IICs to an enriched scan data component 344, which may combine the item information and IIC to create enriched item information, as discussed with respect to the update message generator 270 of FIG. 2. The enriched item information may be communicated to the store group 320 or any one or more user devices 322a through 322n therein, using the second IoT topic or in a non-IoT formatted message, via the reports component 352 of the store inventory services group 350, to a reports component 352 of the store inventory services.

The analytics cloud group 370 may store inventory reports and provide access to such stored inventory reports to devices external to system 300. For example, a corporate office may desire to perform stock analytics for a particular item. The stored inventory record located in analytic storage 374 may be queried and relevant information identified and communicated to the external device.

It should be noted that though the various groups of system 300 are depicted apart, any one or more groups or components thereof may be located remote to or in the same location as any other. In one aspect, it is conceived that the RFID managed cloud service 330 is a vendor-provided group of components, devices, and or modules, such as is provided by Amazon Web Services IoT.

Figure 4:
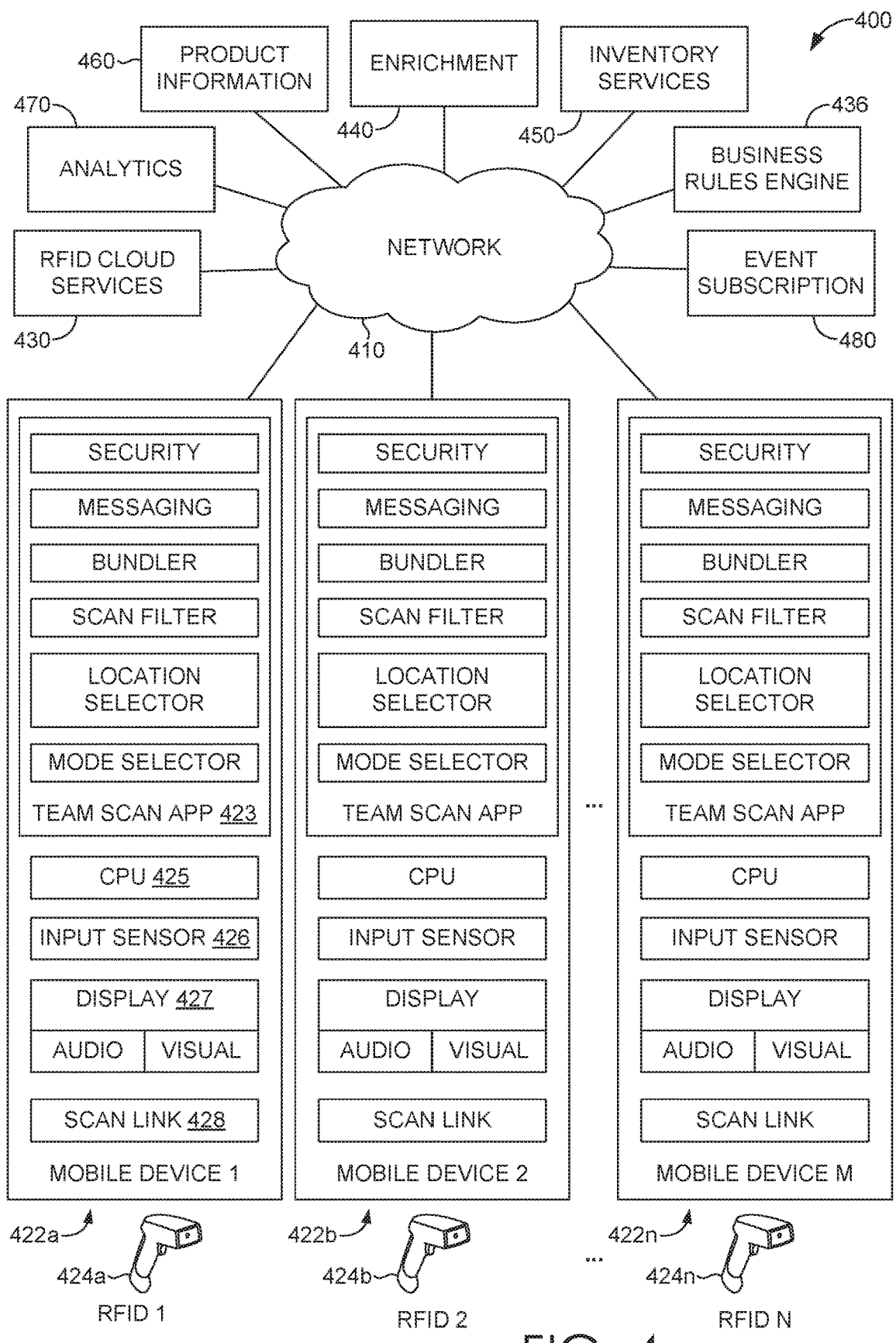
FIG. 4 is a diagram depicting an example computing architecture suitable for implementing aspects of the technology described herein.

Turning now to FIG. 4, an exemplary architecture for a system 400 configured to perform RFID tracking in accordance with aspects herein is depicted. The system 400 may comprise a network 410 comprising one or more features of the network 210 of FIG. 2, an RFID cloud services group 430 comprising one or more components or features of the RFID managed cloud service (or group) 330 of FIG. 3, an enrichment component 440 comprising one or more components or features of the RFID services group 340 of FIG. 3, an inventory server component 450 comprising any one or more features of the store inventory services group 350 of FIG. 3, a product information component 460 comprising any one or more components or features of product information services group 360 of FIG. 3, an analytics component 470 comprising any one or more components or features of the analytics group of 370 of FIG. 3, a business rules engine component 436 comprising one or more features of the business rules engine 336 of FIG. 3, and an event subscription component 480 comprising any one or more components or features of the event subscription services group 380 of FIG. 3.

The system 400 may further comprise a plurality of user devices 422a through 422n, such as a first user device 422a and a second user device 422b. Each user device such as the first user device 424a may comprise a processor 425, an input sensor 426, a display 427, and a scan link 428, wherein the user device 422a may further comprise a team scan app (or application) 423. In one aspect, the team scan app 423 is developed using a dependency manager with one or more dynamic frameworks or libraries. For example, an iOS device might employ a Cocoapod dependency manager for the swift development language. As a second example, an Android device might employ the Kotlin programming language. The processor 425 provides processing resources for performing the features of the claimed technology, such as those described with respect to system 200 of FIG. 2. The input sensor 426 may provide a means for receiving information from the user, such as a request to initiate a scan session, a request to join an existing scan session, or an input of location information. The input sensor 426 may comprise a microphone for spoken inputs, a virtual keyboard for receiving text-based input, or a touchscreen for receiving touch input. The display 427 provides a means for communicating information from the user device 422a to a user. Such information may include information regarding a scanned item, enriched item information, or an indication, whether audible, visual, or tactile, that new RFID scan data has been communicated to the mobile device 422a. The scan link 428 provides a bridge or means for connecting to the scanner 424a through 424n; for example, the first user device 422a may be connected to a first scanner 424a and a second user device 422b may be connected to a second scanner 424b. In some aspects, the scan link 428 may comprise a wired connection, such as a USB connection; in other aspects, the scan link may be wireless, such as via NFC, Bluetooth, or a cellular connection, or the like.

The team scan app 423 may comprise one or more components, features, or modules for performing the RFID tracking procedures of the current description. In particular, the team scan app 423 may comprise a mode selector that allows a user to select whether they desire to initiate a new scanning session, join an already existing scanning session, or what type of inventory they wish to conduct (e.g., a binary inventory or a complete inventory). The team scan app 423 may comprise a location selector that allows for location to be manually selected via a prompt or input. The team scan app 423 may further comprise a scan filter, which filters received scan data, and a bundler which may perform aggregation operations described herein, e.g., with respect to the user device 222a of FIG. 2. A messaging component may provide the means for generating and communicating a message comprising a first group of one or more IICs to one or more backend computing devices. In one aspect, the messaging component implements the features of the MQTT protocol. In one aspect, the messaging component performs the operations of a WebStream WebSocket client. A security module of the team scan app 423 may provide authentication authorization and accounting services, as well as encryption services, in particular to the messaging component, such that intercepted messages may be protected from being understood by unintended recipients. In one aspect, an authentication, authorization, and accounting library provides a jot to the security module. The security module may provide jots to the MQTT topic and the MQTT topic may have a custom authorizer associated with it. A lambda server may validate the jots that are calling against the MQTT topic.

Figure 5:
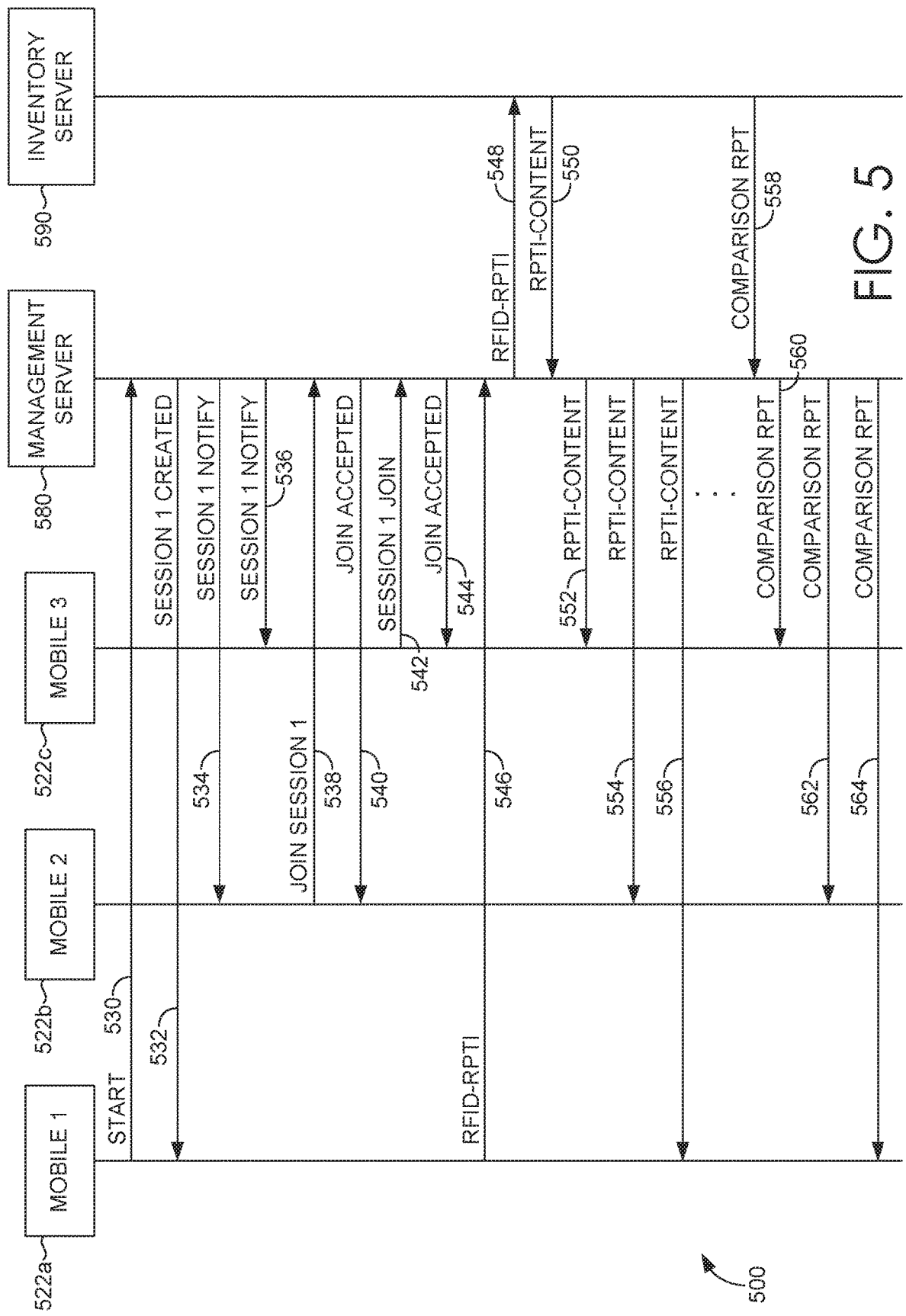
FIG. 5 depicts a flow diagram of an exemplary method for conducting a team scanning session, in accordance with aspects of the technology described herein.

Turning now to FIG. 5, a flow chart is provided for illustrating a method 500 for performing the team scanning features described herein. The method 500 comprises interactions between a plurality of user devices, a management server 580, and an inventory server 590. As used with respect to method 500, any one or more of the first user device 522a, the second user device 522b, and/or the third user device 522c may have any one or more components or features of the user device 222a of FIG. 2. The management server 580 may have any one or more components or features described with any one or more backend computing devices discussed with respect to the system 200 of FIG. 2, specifically, the management server 580 may be the scan session manager 240 of FIG. 2.

The first step 530 of method 500 comprises an indication from a first user device 522a to a management server 580 that the first user device 522a desires to create a team scanning session. In response to the first step 530, the management server 580 may respond by creating a team scanning session 532 and communicating that the session has been created to the first user device 522a. Subsequently, in steps 534 and 536, the management server 580 may notify each of the second user device 522b and the third user device 522c, respectively, that the team scanning session has been created. The second user device 522b may join the team scanning session at step 538 by communicating its request to join said session to the management server 580. In response, the management server 580 may respond by accepting the second user device request to join at step 540. The third user device 522c may request to join the team scanning session at step 542 by way of a request to the management server 580. In response to the third user device 522c, the management server 580 may accept the third user device request to join step 544. At this point, each of the first user device 522a, the second user device 522b, and a third user device 522c are all participating in the team scanning session.

At a step 546 the first user device 522a communicates an initial report of RFID scan data to this management server 580. Management server 580 forwards the initial RFID scan data report to the inventory server 590 at a step 548. At step 550, an initial report content is provided from the inventory server 590 to the management server 580 and step 552, 554, and 556, and the initial report content is provided to each of the third user device 522c, the second user device 522b, and the first user device 522a, respectively.

In some aspects, the initial report content may comprise an inventory record for the particular team scanning session, comprising any one or more facets of the feedback provided to the user devices 222a through 222n of system 200 in FIG. 2. Subsequent to receiving the initial report content, and not depicted in FIG. 5, any one or more of the first user device 522a, the second user device 522b, and/or the third user device 522c may communicate additional RFID scan data to the management server 580 and onto the inventory server 590. In response to additionally received RFID scan data, the inventory server 590 may prepare an inventory record in the manner described with respect to the analytics engine 250 of system 200 in FIG. 2.

In one aspect, inventory server 590 performs aggregation of data using a database such as the Aurora relational database. For example, in a binary aspect, a front of store product ID list is aggregated in a first list and a back of store product ID list is aggregated in a second list. The database performs a difference operation between a first list and a second list and obtains a result list of product IDs in the back of store that did not appear in the front of store list. This result list is enriched with product description information for each product ID and the resultant data forms part of a comparison report.

At steps 558, 560, 562, and 564, the comparison report is communicated from the inventory server 590, to the management server 580, and then on to each of the first user device 522a, the second user device 522b, and third user device 522c. In this way, each of the first user device 522a, the second user device 522b, and a third user device 522c may be made aware of any RFID scan data obtained from any one or more of the other user devices.

Figure 6:
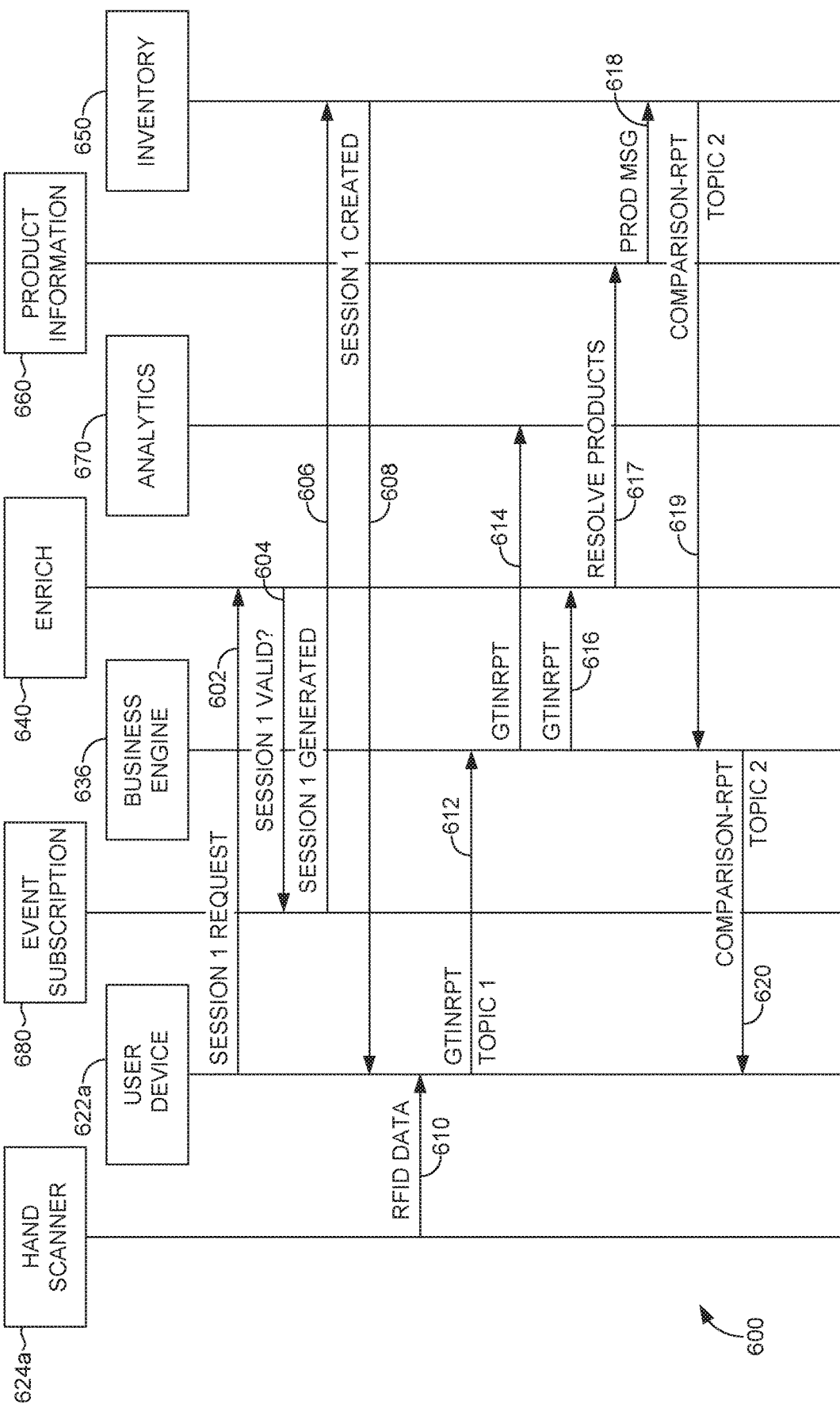
FIG. 6 depicts a flow diagram of a method for communicating inventory information, in accordance with aspects of the technology described herein.

Turning now to FIG. 6, a method 600 for performing the RFID tracking described herein is provided. The method 600 includes one or more interactions between a scanner 624a, a user device 622a, an event subscription component 680, a business engine component 636, enrichment component 640, an analytics component 670, a product information component 660, and an inventory component 650. The hand scanner 624a may have any one or more components or features of the scanner 224a of FIG. 2. The user device 622a may have any one or more components or features of the user device 222a of FIG. 2. The event subscription component 680 may have any one or more components or features of the event subscription services group 380 of FIG. 3. The business engine component 636 may have any one or more components or features of the business rules engine 336 of FIG. 3. The enrichment component 640 may have any one or more features or components of the RFID services group 340 of FIG. 3. The analytics component 670 may have any one or more features or components of the analytics cloud group 370 of FIG. 3. The products information component 660 may have any one or more components or features of the product information services group 360 of FIG. 3. Finally, the inventory component 650 may have any one or more components or features of the store inventory services group 350 of FIG. 3.

At a first step 602, the user device 622a may request a scanning session to be initiated to the enrichment component 640. In response, the enrichment component 640 may determine, in communication with the event subscription component 680 at a step 604, whether or not the scan session request is valid. If the session request is valid, the event subscription component 680 may generate a scanning session and communicate to the inventory component 650 that the scanning session has been generated at a step 606. In response, the inventory component 650 may communicate to the user device 622a that the scanning session has been created at a step 608. Once the scanning session has been created, the scanner 624a may provide RFID scan data to the first user device 622a at step 610. The user device 622a may perform any one or more filtering and/or aggregation functions and communicate a first message comprising a first group of IIC's to the business engine component 636 at step 612 according to an IoT protocol, such as MQTT, using a first IoT topic. At step 614, the business engine component 636 may pass the first group of IICs to the analytics component 670 as well as to the enrichment component 640 at step 616. The enrichment component 640 may identify a particular item from the first group of IICs and communicate the identified item to the product information components 660 at step 617. Subsequent to the item being identified to the product information components 660, the product information components 660 may communicate enriched item information to the inventory component 650. The inventory component 650 may combine the enriched item information with the inventory record and communicate such information to the business engine component 636 at a step 619, using a second IOT topic. At steps 620, the business engine component 636 completes the feedback loop by sending the inventory record to the user device 622a using the second IOT topic.

Figure 7B:
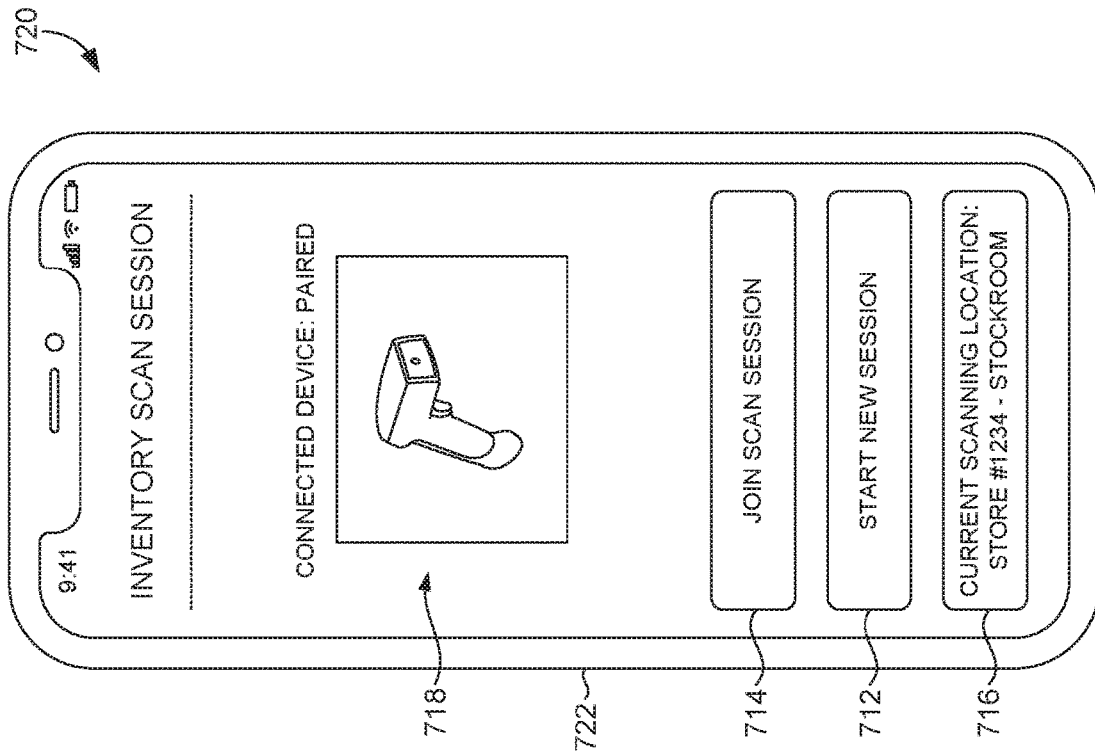
FIGS. 7A-7B illustrate exemplary user interfaces that may be displayed by a user device in accordance with aspects of the technology described herein.
Figure 7A:
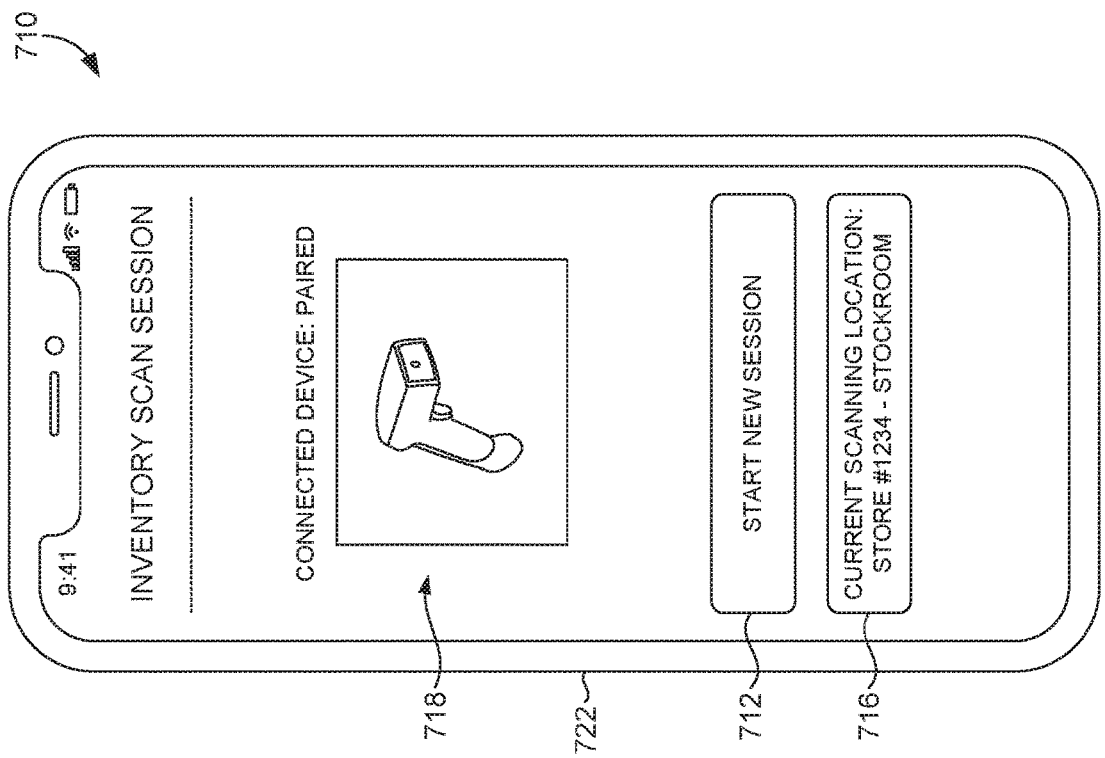

Turning now to FIGS. 7A-7B, exemplary displays of a user interface of a user device 722 are provided. With respect to FIG. 7A, a first user interface 710 represents what may be displayed to a user when no scanning session is currently ongoing. The first user interface 710 comprises an indication 718 that a connected device, such as a scanner, is paired to said user device 722. The user interface 710 may additionally comprise an indication to start a new session 712. By interacting with the start new session option 712, the user device is instructed to request the initiation of a scan session or initiate a scan session on its own as described with respect to the first user device 222a and scan session manager 240 of the system 200 in FIG. 2. The first user interface 710 may additionally comprise a prompt for inputting a location 716. As discussed herein, location information may be manually entered in response to the display of a prompt or field such as the prompt 716. Turning now to FIG. 7B, a second user interface 720 is provided, wherein the second user interface 720 may be displayed once it is detected that a first scan session is currently ongoing in response to being created by a different user device. Accordingly, the second user interface 720 may comprise any one or more features of the first user interface 710 with the additional indication of a joint scan session prompt 714. By interacting with the joint scan session prompt 714, the user device 722 may communicate with one or more backend computing devices that the user device 722 desires to join the scanning session already in progress.

Turning now to FIG. 8, a series of exemplary interactions 800 in a retail setting are illustrated. These interactions may involve various components and/or may implement various methods discussed above.

Although the subject technology is often described herein with reference to a business, retailer, and consumer, it is understood that these scenarios are exemplary only. The technology described herein may be applied to any context in which an entity desires to track a plurality of different physical assets. It could be applied to any number of other scenarios where it is desirable to know what physical assets are present and which are not. For example, an airline could couple an RIFD tag to a plurality of baggage claim tags to determine whether all required luggage has been loaded into a cargo hold or supplied to a correct baggage claim. Accordingly, the present technology provides solutions to similar problems beyond the inventory context. The technology described herein may be used to provide for improved low-latency tracking of physical assets coupled to an RFID tag due to the increased efficiency and accuracy of completing an inventory-like procedure.

Having described various implementations, an exemplary computing environment suitable for implementing aspects of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of aspects of the disclosure. Neither should the computing device 900 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

Figure 9:
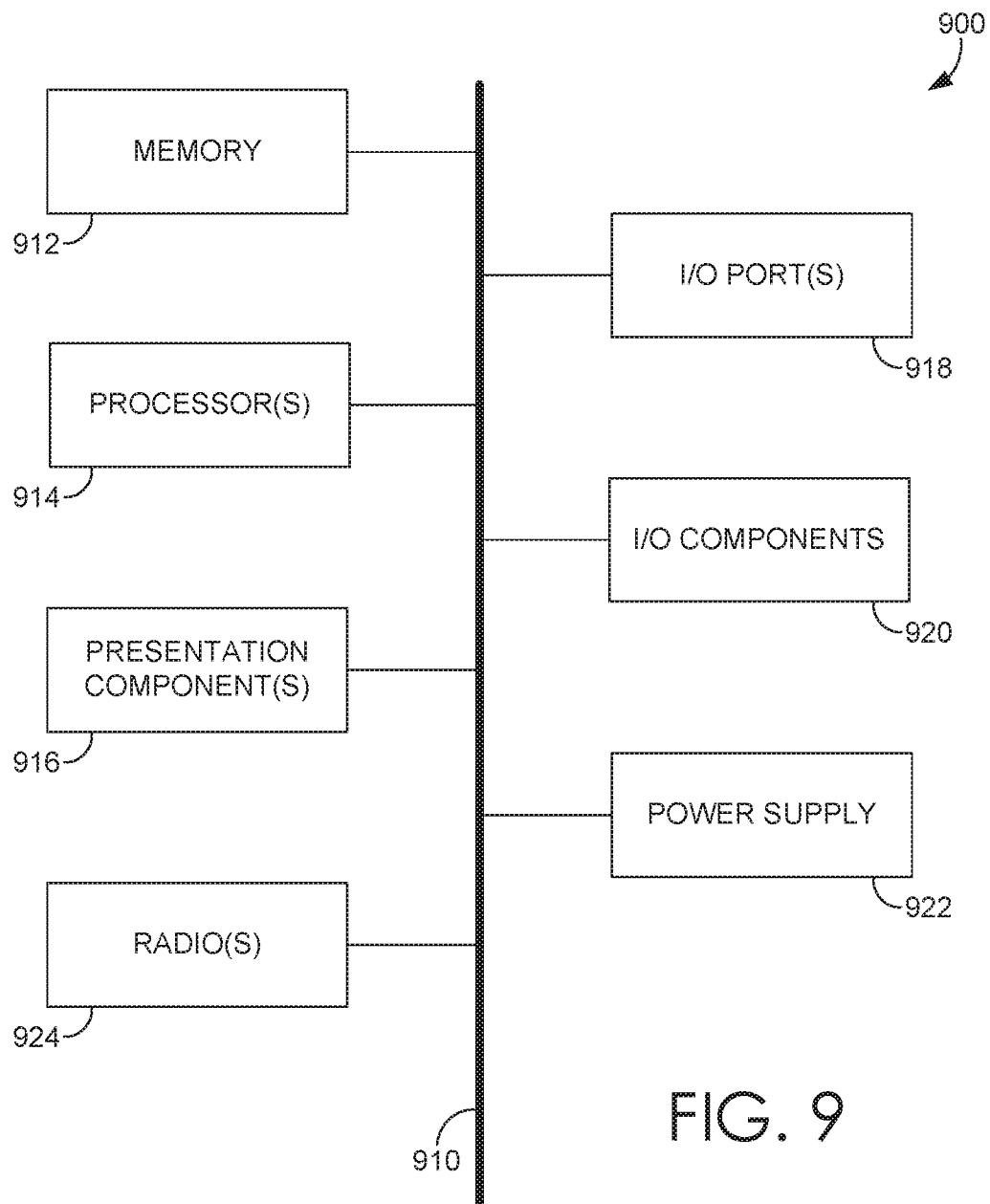
FIG. 9 is a block diagram of an exemplary computing environment suitable for implementing aspects of the technology described herein.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some implementations of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

The preceding discussions may be practically applied to any one or more of a number of various, non-limiting use-case examples. In a first use-case, a prospective customer may desire to know where a particular item may be purchased or is on display. The technologies described herein may be used to cause relevant inventory and location information to be obtained and displayed to the prospective customer via a user interface of a mobile device. The low-latency inventory and location information may convert the prospective customer into a customer and/or improve the prospective customer's shopping experience.

In another use-case, a particular item may be needed in large numbers and updated inventory from a plurality of locations may be desired to determine whether additional inventory should be staged in advance of the need. In an example, a basketball tournament may be expected to take place in a few weeks and 500 hundred regulation-sized basketballs will be needed to meet the tournament's demand. Retailers in the vicinity of the tournament location may be specifically queried to determine how many of the basketballs are available amongst them. If the number is less than 500, additional basketballs may be provided to any one or more of the area retailers in order to meet the expected demand. In yet another use-case, the technologies described herein may provide retailers with information regarding whether or not a particular item is on display in a showroom when in stock. For example, an inventory of a stockroom may indicate that at least one pair of Air Force Ones is in stock and an inventory of a showroom may indicate that no Air Force Ones are presently on display and provide a notification that at least one pair of Air Force Ones should be moved from the stockroom to the showroom, in order that they may be viewed and/or purchased by a prospective customer.

In another use-case, a retailer may determine, by conducting an inventory of a showroom and/or stockroom, that a particular item, such as size 10 Air Zoom shoes, may be in low stock or not in stock at all. Using the improved low-latency system provided by the technologies described herein, the retailer may proactively (low stock) or reactively (not in stock) order additional pairs of shoes in order that the shoes are more quickly or seamlessly available for purchase by a prospective customer.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A system for using radio frequency identification (RFID) to manage inventory, the system comprising a first user device, the first user device configured to receive a first plurality of RFID scan data for a first scanning session, filter the first plurality of RFID scan data to determine a first set of filtered item identification codes (IICs), aggregate a plurality of the first set of filtered IICs to form a first set of IICs, generate a first message based on the first set of IICs; and communicate, utilizing a first Internet of Things (IoT) topic, the first message to one or more backend computing devices.

Clause 2. The system of clause 1, wherein the first device is further configured to receive, from the one or more backend computing devices and utilizing a second IoT topic, a comparative inventory message including an inventory list comprising information corresponding to at least a first IIC from the first scanning session.

Clause 3. The system of any of the preceding clauses, wherein the inventory message further includes enriched data describing at least one item corresponding to the first IIC of the first set of IICs Clause 4. The system of any of the preceding clauses, wherein the first user device is further configured to display at least a portion of the second message on a user interface of the first user device Clause 5. The system of any of the preceding clauses, wherein the system further comprises a second user device configured to join the first scanning session, receive a second plurality of RFID scan data, filter the second plurality of RFID scan data to determine a second set of filtered IICs; aggregate a plurality of the second set of filtered IICs to form a second set of IICs; generate a second message based on the second set of IICs, communicate the second message to the one or more backend computing devices using the first Internet of Things (IoT) topic, and receive, utilizing the second IoT topic, the comparative inventory message including the inventory list, wherein the comparative inventory list further comprises the information corresponding to the first IIC of the first set of IICs or information corresponding to a second IIC from the second set of IICs, from the first scanning session.

Clause 6. The system of clause 5, wherein the second user device is further configured to determine the second set of IICs from the second plurality of RFID scan data; and wherein filtering the second plurality of RFID scan data comprises: based on a determination that a third IIC is included in the first set of IICs or the second set of IICs, ignoring a portion of the plurality of RFID scan data that corresponds to the third IIC.

Clause 7. The system of clause 6, wherein filtering the second plurality of RFID scan data further comprises: based on a determination that a fourth IIC is not included in the first set of IICs or the second set of IICs, causing a notification to be emitted on the first user device thereby indicating that a scanned item corresponding to the fourth IIC has not previously been scanned during the first scanning session.

Clause 8. The system of any of the preceding clauses, wherein the first user device is further configured to determine the first set of IICs from the first plurality of RFID scan data; and wherein filtering the first plurality of RFID scan data comprises: from a first portion of the first plurality of RFID scan data, based on a determination that a first IIC is included in the first set of IICs, ignoring a second portion of the first plurality of RFID scan data that corresponds to the first IIC.

Clause 9. The system of any of the preceding clauses, wherein the generation of the first message based on the first set of IICs comprises including the first set of IICs in the first message, and wherein each IIC in the first set of IICs corresponds to an item scanned from the first scanning session.

Clause 10. The system of any of the preceding clauses, wherein the aggregation comprises, for a first IIC in the first set of filtered IICs, determining a product identifier corresponding to the first IIC, and generating an aggregate product identifier comprising the product identifier and the first IIC, wherein the first message includes the aggregate product identifier.

Clause 11. The system of any of the preceding clauses, wherein the system further comprises the one or more backend computing devices, and wherein the one or more backend computing devices are configured to receive the first message from the first user device, utilize the first message to generate an inventory message including at least a comparative inventory list comprising information corresponding to at least a first IIC from the first set of IICs from the first scanning session, and communicate the inventory message to the first user device.

Clause 12. The system of clause 11, wherein the one or more backend computing devices are further configured to generate the inventory message further including enriched data describing at least one item corresponding to the first IIC of the first set of IICs.

Clause 13. The system of any of the preceding clauses, wherein the first message further comprises a location of the first scan session.

Clause 14. The system of clause 13, wherein the location of the first scan session is determined based on a physical location of the first user device, and wherein the first user device is further configured to determine the physical location by utilizing a sensor associated with the first user device.

Clause 15. The system of clause 13, wherein the first user device is further configured to receive an indication of the location of the first scan session from a user of the first user device.

Clause 16. The system of any of the preceding clauses, wherein the RFID scan data comprises a Global Trade Identification Number (GTIN), Serialized GTIN (SGTIN), or Electronic Product Code (EPC).

Clause 17. The system of any of the preceding clauses, wherein communicating the first message, utilizing a first Internet of Things (IoT) topic, comprises utilizing a Message Queuing Telemetry Transport (MQTT) protocol.

Clause 18. The system of any of the preceding clauses, wherein the first user device receives the first plurality of RFID scan data from a first RFID scanner.

Clause 19. A computerized method for tracking inventory using radio frequency identification (RFID) comprising: receiving, at a first device, a first plurality of RFID scan data for a scanning session, filtering, by the first device, the first plurality of RFID scan data to determine a first set of filtered item identification codes (IICs), aggregating a plurality of the first set of filtered IICs to form a first set of IICs; generating a first message based on the first set of IICs and communicating, by the first device to a second device, the first message using a first Internet of Things (IoT) topic.

Clause 20. The method of clause 19, wherein the first set of IICs are determined from the first plurality of RFID scan; and wherein the filtering comprises: from a first portion of the first plurality of RFID scan data, based on a determination that a first IIC is included in the first set of IICs, ignoring a second portion of the first plurality of RFID scan data that corresponds to the first IIC.

Clause 21. The method of any of clauses 19-20, wherein the method further comprises receiving, from the second device, an inventory message; wherein the inventory message includes a comparative inventory list; wherein the comparative inventory list comprises at least a first IIC from the first set of IICs; and wherein the inventory message is communicated to the first user device using a second IoT topic.

Clause 22. The method of any of clauses 19-21, wherein the method further comprises requesting, by the first device, that the second device initiate the scanning session, and wherein the first plurality of RFID scan data is received during the scanning session.

Clause 23. The method of any of clauses 19-22, wherein the first message is communicated from the first device to the second device using a Message Queuing Telemetry Transport (MQTT) protocol.

Clause 24. A computerized system comprising: one or more computer processors having computer-useable instructions stored thereon that, when executed by the one or more computer processors, cause the one or more computer processors to perform operations comprising: receiving a first message from a first user device using a first IoT topic, the first message comprising a first set of item identification codes (IICs) for a first scanning session, based on the first set of IICs, creating an inventory list for the first scanning session, causing at least the inventory list for the first scanning session to be communicated in a second message to the first user device using a second IoT topic.

Clause 25. The system of clause 24, wherein the operations further comprise: subsequent to communicating the second message, receiving a third message from the first user device using the first IoT topic, the third message comprising a second set of IICs, wherein the second set of IICs is distinct from the first set of IICs, creating an inventory record based on the first and the second sets of IICs, and causing the updated inventory list to be communicated in a fourth message to the first user device using the second IoT topic.

Clause 26. The system of any of clauses 24-25, wherein the operations further comprise: causing the updated inventory list to be communicated to a second user device using the second IoT topic, wherein the second user device has joined the first scanning session.

Clause 27. The system of any of clauses 24-26, wherein the operations further comprise initiating the first scanning session upon receiving a request from the first user device.

Clause 28. The system of any of clauses 24-27, wherein the second message is communicated to the first user device using a Message Queuing Telemetry Transport (MQTT) protocol.

Clause 29. The system of any of clauses 24-28, wherein the operations further comprise: based on the first set of IICs, determining a set of enriched data describing at least one item corresponding to an IIC of the first set of IICs; and causing the set of enriched data to be communicated in the second message.

Clause 30. The system of any of clauses 24-29, wherein the operations further comprise utilizing the first set of IICs to update a record on a distributed ledger associated with an item corresponding to an IIC of the first set of IICs.

Clause 31. The system or method of any of the preceding clauses wherein a message received from the one or more backend computing devices may include, in addition to the updated inventory list and/or the enriched item information, one or more inventory reports, such as a comparative report for a front (showroom) vs. back (storeroom) of a store.

Clause 32. The system of method of any of the preceding clauses wherein a message received from the one or more backend computing devices may include, in addition to the updated inventory list and/or the enriched item information, a comparative inventory report that provides a comparison of a first inventory at a first location to a second inventory at a second location, the first location being a different location than the second location.

Clause 33. The system or method of any of the preceding clauses wherein filtering a plurality of RFID scan data comprises: for a first RFID scan data item in the first plurality of RFID scan data, determining a first product identifier corresponding RFID scan data item; searching for the first product identifier in a list of one or more previously determined product identifiers; and including the first product identifier in the first set of filtered IICs when the searching determines that the first product identifier is not in the list of one or more previously determined product identifiers.

Many different arrangements of the various components depicted, as well as components not shown, are possible without departing from the scope of the claims below. Implementations of the disclosure have been described with the intent to be illustrative rather than restrictive. Alternative implementations will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system for using radio frequency identification (RFID) to manage inventory, the system comprising:
a user device, the user device configured to:
receive a first plurality of RFID scan data for a first scanning session;
determine a desired granularity of a binary inventory session;
filter the first plurality of RFID scan data to determine a first set of filtered item identification codes (IICs), wherein the filtering comprises determining that each of a first RFID scan data item and a second RFID scan data item correspond to a first IIC at the desired granularity, and filtering out the second RFID scan data item;
aggregate a plurality of the first set of filtered IICs to form a first set of IICs wherein the first set of filtered IICs comprises the first IIC;
generate a first message indicating that at least one instance of each IIC of the first set of IICs was scanned; and
communicate the first message to one or more backend computing devices.

2. The system of claim 1, wherein the filtering further comprises determining that each of a third RFID scan data item and a fourth RFID scan data item correspond to a second IIC at the desired granularity, and filtering out the fourth RFID scan data item, and wherein the first set of filtered IICs further comprises the second IIC.

3. The system of claim 2, wherein the first RFID scan data item comprises a first identifier associated with a first RFID tag coupled to a first inventory item, the second RFID scan data item comprises a second identifier associated with a second RFID tag coupled to a second inventory item, the third RFID scan data item comprises a third identifier associated with a third RFID tag coupled to a third inventory item, and the fourth RFID scan data item comprises a fourth identifier associated with a fourth RFID tag coupled to a fourth inventory item, each of the first, second, third and fourth inventory items being different, and each of the first, second, third, and fourth identifiers being different.

4. The system of claim 3, wherein the first message is communicated to the one or more backend computing devices using a first Internet of Things (IoT) topic.

5. The system of claim 4, wherein the user device is further configured to receive, from the one or more backend computing devices and in response to communicating the inventory message, an updated inventory report comprising a plurality of unique item identification codes from the first set of RFID scan data and a second set of RFID scan data.

6. The system of claim 5, wherein the updated inventory report is communicated to the user device using a second IoT topic, the second IoT topic being different than the first IoT topic.

7. The system of claim 6, wherein the aggregating further comprises determining a first product identifier that corresponds to the first IIC and a second product identifier that corresponds to the second IIC, and wherein the first message comprises each of the first product identifier, the first IIC, the second product identifier, and the second IIC.

8. The system of claim 7, wherein the user device is further configured to determine, based at least in part on a physical location of the user device, a location of the first inventory item and the second inventory item.

9. The system of claim 8, wherein the user device is configured to output an indication as a result of determining that each of the first IIC and the second IIC comprise additional RFID data, relative to the first set of RFID scan data, the indication comprising one or more of an audible output, a visible output, and a tactile output.

10. A system for using radio frequency identification (RFID) to manage inventory, the system comprising:
a user device, the user device configured to:
receive a first plurality of RFID scan data for a first scanning session;
determine a desired granularity of a complete inventory session;
filter the first plurality of RFID scan data to de-duplicate a first instance and a second instance of a first RFID scan data item, wherein de-duplicating comprises filtering out the second instance of the first RFID scan data item;
filter the first plurality of RFID scan data to de-duplicate a first instance and a second instance of a second RFID scan data item, wherein
said de-duplicating comprises filtering out the second instance of the second RFID scan data item;
based on a determination that the first RFID scan data item has a first item identification code (IIC) at the desired granularity and a determination that the second RFID scan data item has the first IIC at the desired granularity, aggregate a first set of IICs comprising the first IIC and a number of RFID scan data items of the first plurality of RFID scan data having the first IIC at the desired granularity;
generate a first message comprising the first set of IICs and the number of RFID scan data items of the first plurality of RFID associated with each IIC of the first set of IICs; and
communicate the first message to one or more backend computing devices.

11. The system of claim 10, wherein the aggregating further comprises determining that each of a third RFID scan data item and a fourth RFID scan data item correspond to a second IIC at the desired granularity, and wherein the first set of IICs comprises the second IIC and a number of RFID scan data items having the second IIC at the desired granularity.

12. The system of claim 11, wherein the first RFID scan data item comprises a first identifier associated with a first RFID tag coupled to a first inventory item, the second RFID scan data item comprises a second identifier associated with a second RFID tag coupled to a second inventory item, the third RFID scan data item comprises a third identifier associated with a third RFID tag coupled to a third inventory item, and the fourth RFID scan data item comprises a fourth identifier associated with a fourth RFID tag coupled to a fourth inventory item, each of the first, second, third and fourth inventory items being different, and each of the first, second, third, and fourth identifiers being different.

13. The system of claim 12, wherein the first message is communicated to the one or more backend computing devices using a first Internet of Things (IoT) topic.

14. The system of claim 13, wherein each of the first RFID scan data item, the second RFID scan data item, the third RFID scan data item, and the fourth RFID scan data item are associated with a plurality of IICs, each of the plurality of IICs having a different characteristic, and wherein the plurality of IICs comprises an IIC at the desired granularity.

15. The system of claim 14, wherein the user device is further configured to receive, from the one or more backend computing devices and in response to communicating the inventory message, an updated inventory report comprising a plurality of unique item identification codes from the first set of RFID scan data and a second set of RFID scan data.

16. The system of claim 15, wherein the updated inventory report is communicated to the user device using a second IoT topic, the second IoT topic being different than the first IoT topic.

17. The system of claim 16, wherein the user device is further configured to determine, based at least in part on a physical location of the user device, a location of the first inventory item and the second inventory item.

18. A method for tracking inventory using radio frequency identification (RFID) comprising:
receiving a first plurality of RFID scan data for a first scanning session;
determining a desired granularity of a binary inventory session;
filtering the first plurality of RFID scan data to determine a first set of filtered item identification codes (IICs), wherein the filtering comprises determining that each of a first RFID scan data item and a second RFID scan data item correspond to a first IIC at the desired granularity, and filtering out the second RFID scan data item;
aggregating a plurality of the first set of filtered IICs to form a first set of IICs wherein the first set of filtered IICs comprises the first IIC;
generating a first message indicating that at least one instance of each IIC of the first set of IICs was scanned; and
communicating the first message to one or more backend computing devices.

19. The method of claim 18, wherein the filtering further comprises determining that each of a third RFID scan data item and a fourth RFID scan data item correspond to a second IIC at the desired granularity, and filtering out the fourth RFID scan data item, and wherein the first set of filtered IICs further comprises the second IIC.

20. The method of claim 19, wherein the first RFID scan data item comprises a first identifier associated with a first RFID tag coupled to a first inventory item, the second RFID scan data item comprises a second identifier associated with a second RFID tag coupled to a second inventory item, the third RFID scan data item comprises a third identifier associated with a third RFID tag coupled to a third inventory item, and the fourth RFID scan data item comprises a fourth identifier associated with a fourth RFID tag coupled to a fourth inventory item, each of the first, second, third and fourth inventory items being different, and each of the first, second, third, and fourth identifiers being different.

\* \* \* \* \*